US012689429B1

(12) United States Patent
Amini-Naieni et al.

(10) Patent No.: US 12,689,429 B1
(45) Date of Patent: Jul. 21, 2026

(54) TECHNIQUES FOR CALCULATING THE ARRAY FACTOR OF A PHASED ARRAY ANTENNA

(71) Applicant: Amazon Technologies, Inc., Seattle, WA (US)

(72) Inventors: Niki Amini-Naieni, Medina, WA (US); Alireza Mahanfar, Kirkland, WA (US); Peter James Hetzel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 17/361,155

(22) Filed: Jun. 28, 2021

(51) Int. Cl.
| | |
|---|---|
| *H04B 7/08* | (2006.01) |
| *H01Q 3/36* | (2006.01) |
| *H01Q 3/40* | (2006.01) |
| *H01Q 21/06* | (2006.01) |
| *H04B 7/0426* | (2017.01) |
| *H04B 7/06* | (2006.01) |

(52) U.S. Cl.
CPC ............... *H04B 7/086* (2013.01); *H01Q 3/36* (2013.01); *H01Q 3/40* (2013.01); *H01Q 21/061* (2013.01); *H04B 7/043* (2013.01); *H04B 7/0617* (2013.01)

(58) Field of Classification Search
CPC ...... H04B 7/086; H04B 7/043; H04B 7/0617; H01Q 3/36; H01Q 3/40; H01Q 21/061
See application file for complete search history.

(56) References Cited

U.S. PATENT DOCUMENTS

| | | | |
|---|---|---|---|
| 2019/0379565 A1* | 12/2019 | Ma | H04B 7/0452 |
| 2021/0067208 A1* | 3/2021 | Judd | H04B 17/11 |
| 2022/0003857 A1* | 1/2022 | Judd | G01S 13/06 |

OTHER PUBLICATIONS

Constantine A. Balanis, Antenna Theory: Analysis Design, 2005, John Wiley & Sons Inc., 3rd Edition, p. 283-364 (Year: 2005) (Year: 2005).*
Constantine A. Balanis, Antenna Theory: Analysis Design, 2005, John Wiley & Sons Inc., 3rd Edition, p. 283-364, 1016, 1046 (Year: 2005) (Year: 2005).*

(Continued)

*Primary Examiner* — Dameon E Levi
*Assistant Examiner* — Yonchan J Kim
(74) *Attorney, Agent, or Firm* — Kilpatrick Townsend & Stockton LLP

(57) ABSTRACT

Technologies directed to calculating an array factor for a phased array antenna are described. One wireless device with a phased array antenna receives inputs and defines a first variable in a first coordinate space and defines a set of amplitudes of a one-dimensional or two-dimensional inverse Fast Fourier Transform (IFFT). Each amplitude is based on the third value, an excitation amplitude and an excitation phase or delay of a respective antenna element. The wireless device determines first array factor values in the first coordinate space by computing the one-dimensional IFFT using the first variable. The wireless device performs a spline or linear interpolation to obtain second array factors at points in the physical coordinate space. The wireless device sends the second array factors to digital beam forming (DBF) circuitry that causes the phased array antenna to steer a radiation beam using the second array factor values.

19 Claims, 18 Drawing Sheets

FIG. 6A

(56) References Cited

OTHER PUBLICATIONS

G. D. Bergland, A guided tour of the fast Fourier transform, in IEEE Spectrum, vol. 6, No. 7, Jul. 1969, pp. 41-52 (Year: 1969).*

Yang et al.,. A Novel 3-D-NUFFT Method for the Efficient Calculation of the Array Factor of Conformal Arrays. IEEE Transactions on Antennas and Propagation, vol. 69, No. 10, 2021, pp. 7047-7052 (Year: 2021).*

Tariq et al.,. Interpolation Based Radiation Pattern Correction in Conformal Beamforming Arrays. 2019 2nd World Symposium on Communication Engineering (WSCE), 2019, pp. 102-106 (Year: 2019).*

* cited by examiner

700

702

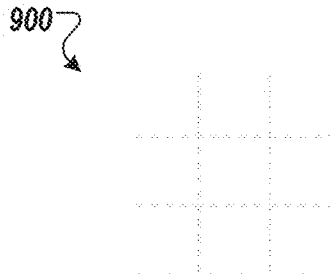
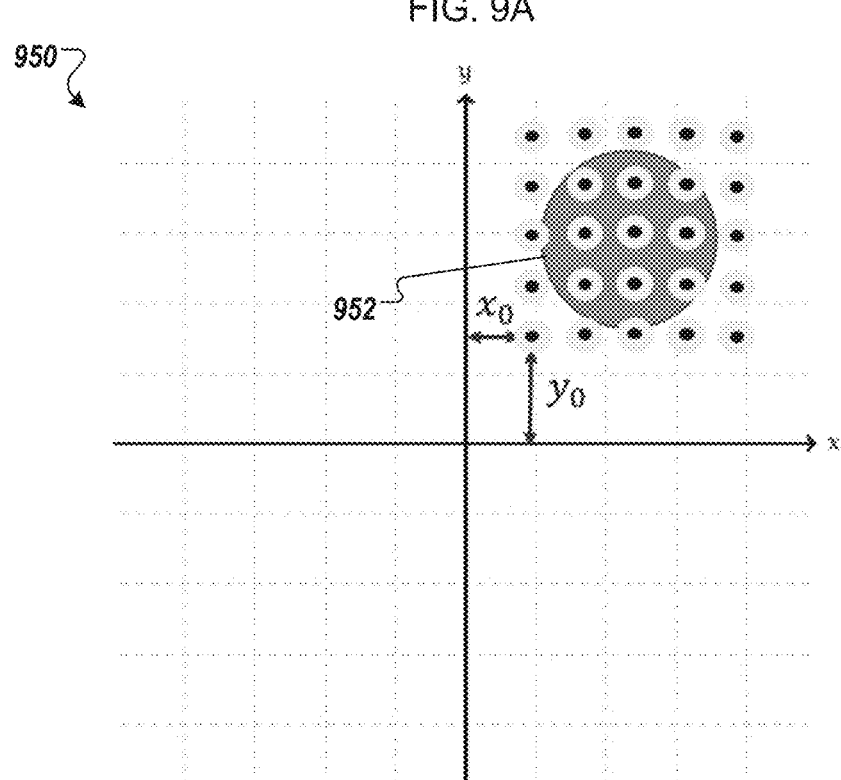
FIG. 9A
FIG. 9B

TECHNIQUES FOR CALCULATING THE ARRAY FACTOR OF A PHASED ARRAY ANTENNA

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of digital media items. These electronic devices include one or more antennas to communicate with other devices wirelessly.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 9A is a rectangular array with elements starting at ($x_0$, $y_0$), according to at least one embodiment.

FIG. 9B is a circular array with elements starting at ($x_0$, $y_0$), according to at least one embodiment.

DETAILED DESCRIPTION

Figure 1:
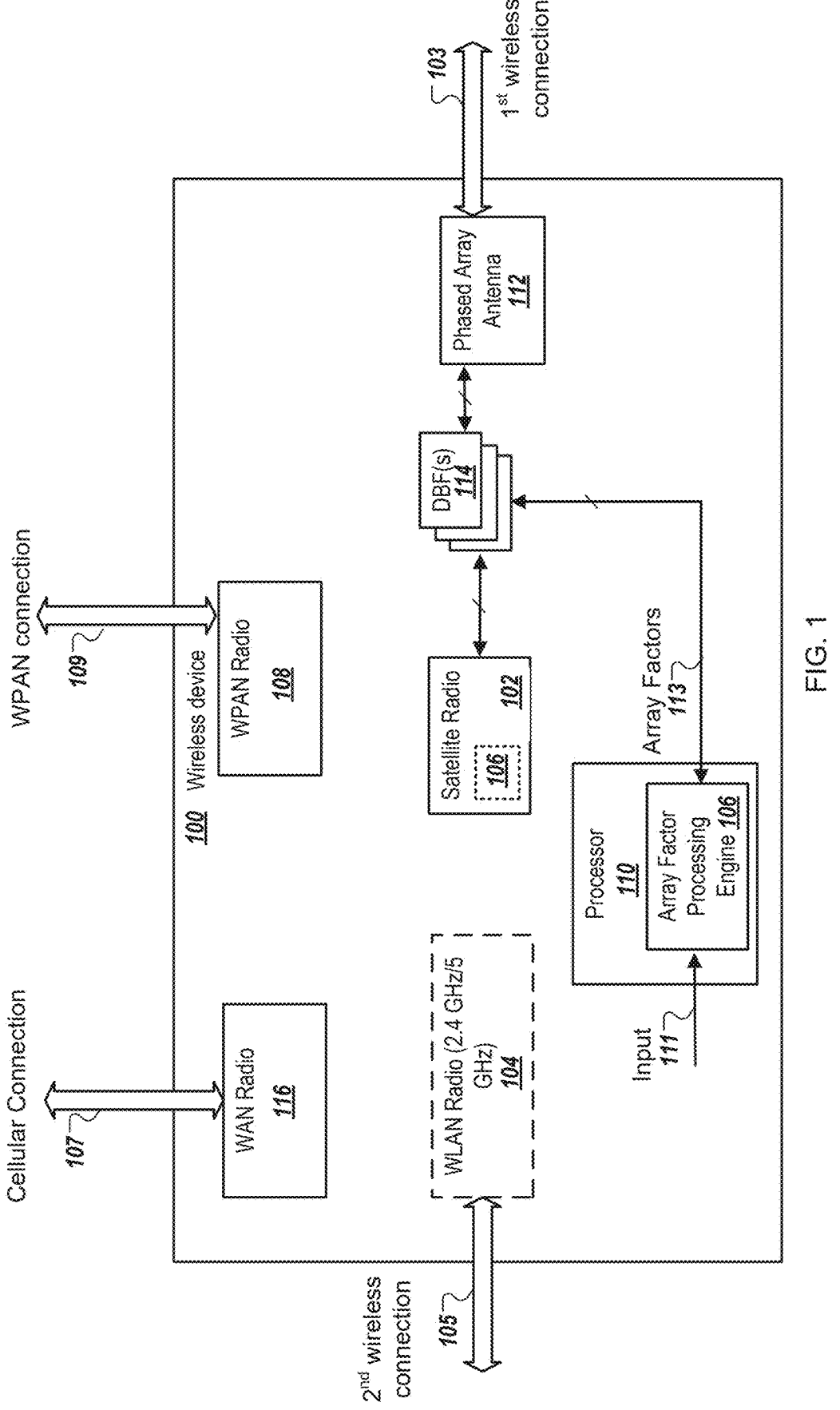
FIG. 1 illustrates a wireless device including an array factor processing engine for calculating array factor values for a phased array antenna, according to at least one embodiment.

Technologies directed to calculating the array factor for a phased array antenna are described. A phased array antenna generates a beam of radio waves that can be electronically steered to point in a direction without moving the antenna elements. The individual elements of the phased array antenna can be driven to a specific magnitude and a specific phase and collectively the antenna elements add together to increase the radiation in the desired direction and cancel to suppress radiation in undesired directions. A digital beam forming (DBF) phased array has circuitry at each element in the array that can be controlled to the specific magnitude and phase to steer a beam or multiple simultaneous beams. Computing the array factor is a significant bottleneck because conventional techniques require a complex nested sum at many points in three-dimensional space.

Aspects of the present disclosure overcome the conventional techniques' deficiencies by providing an array factor processing engine that uses various techniques in connection with the Inverse Fast Fourier Transform (IFFT) to improve the speed of calculation of the array factors for the many points in three-dimensional space. Aspects of the present disclosure can improve the speed to calculate the array factor for linear, rectangular, and circular planar phased arrays with rectangular, triangular, and custom grids by multiple orders of magnitude while maintaining high accuracy and exhibiting additional desirable properties in comparison to conventional techniques. Aspects of the present disclosure can use the periodicity of the IFFT to avoid computing the array factor at negative coordinates (e.g., u, v, or u-v coordinates) in a one-dimensional or two-dimensional coordinate space (also referred to as "u-v coordinate space" or "uv space") corresponding to points in physical three-dimensional space. Aspects of the present disclosure can use linear or spline interpolation in the one-dimensional or two-dimensional coordinate space to improve the accuracy of interpolation. Aspects of the present disclosure can create element masks to support fast array factor calculations for circular planar arrays or other custom shapes. The interpolation technique can allow users to specify points at which the array factor is computed, rather than having these calculation points pre-defined by Fourier Transform parameters. Interpolation additionally can allow users to control the tradeoff between speed and accuracy while adapting the engine to their specific needs. Aspects of the present disclosure can also use Fourier Transform zero-padding techniques to introduce "phantom" elements in specific locations to further enhance the performance of interpolation without increasing the execution time when needed. Also, to support computing the array factor quickly for phased arrays with non-rectangular grids, the aspects of the present disclosure can use a novel coordinate space derived by modifying the u-v coordinate space.

FIG. 1 illustrates a wireless device 100 including an array factor processing engine for calculating array factor values for a phased array antenna, according to at least one embodiment. The wireless device 100 includes a processor 110 and multiple radios, including a satellite radio 102, an optional wireless local area network (WLAN) radio 104, an optional wide area network (WAN) radio 116, and an optional wireless personal area network (WPAN) radio 108. The processor 110 can be any type of processing device that can implement operations associated with array factor processing engine 106, such as described in more detail below. In at least one embodiment, the array factor processing engine 106 is implemented in a computing system used for the design of antennas. In at least one embodiment, the array factor processing engine 106 is used in a wireless device to compute the array factor or the magnitude and phase or delay values of antenna elements to be controlled for a specified pattern. In at least one embodiment, the array factor processing engine 106 can be implemented in a modem, an application core, a System on Chip (SoC), or the like. In at least one embodiment, the array factor processing engine 106 can receive input coordinates of the devices communicating to determine angles for the radiation beams. As described herein, the array factor processing engine 106 can calculate the magnitude and phase or delay values for each antenna element of the phased array antenna 112. The satellite radio 102 creates a first wireless connection 103 between the wireless device 100 and a second wireless device, such as a satellite. In another embodiment, the wireless device 100 can be a satellite device and can communicate with a ground terminal or a customer station. The dual-band radio 104 creates a second wireless connection 105 between the wireless device 100 and another wireless device in a second network. The second wireless connection 105 can be a peer-to-peer wireless connection or peer-to-multiple-peers wireless connections. The optional cellular radio 116 creates a cellular connection 107 between the wireless device 100 and a device in a cellular network (not illustrated). The optional WPAN radio 108 can create a wireless connection 109 between the wireless device 100 and a device in a WPAN. The WPAN radio 108 can be a radio that implements the Bluetooth® technology, ZigBee® technology, Zwave® technology, or the like.

In various embodiments, the wireless device 100 may include memory, storage, one or more wired communication interfaces, two or more wireless communication interfaces, one or more processing devices, or the like. The communication interface, which may include one or more network devices for connecting to the Internet, may be adapted to wirelessly couple the wireless device 100 to one or more network devices of a first network. The processor 110 can process various data including, for example, topology information, such as node location, historical interference event data (e.g., which devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple wireless devices communicate. The data may further include information associated with, or useable to determine, pattern recognition and learning associated with radar event detection, data bandwidth requirements, and latency requirements, and the like. The data may also include scan lists, proximity data, dynamic frequency selection (DFS) channels, requirement sets, or the like.

The wireless device 100 can communicate with other devices on a network. The network may be representative of an Internet or WAN connection. Such an Internet or WAN connection may include additional links or trunks, whether wired or wireless, that may involve other types of wideband communication, including those based on cellular standard(s).

In at least one embodiment, wireless device 100 includes a phased array antenna 112 that includes multiple antenna elements. In at least one embodiment, the phased array antenna 112 can be a linear array with antenna elements organized in a one-dimensional array, such as a linear array with multiple elements arranged in an x-axis or a linear array with multiple elements arranged in a y-axis. In at least one embodiment, the phased array antenna 112 can be a planar array with antenna elements organized in a two-dimensional array, such as a rectangular array, a triangular array, circular array, or an array with custom grids. The wireless device 100 also includes digital beam forming (DBF) circuitry 114. The DBF circuitry can be one or more circuits that are coupled to the antenna elements of the phased array antenna 112. The DBF circuitry can control a magnitude and a phase or delay of an excitation signal at each of the antenna elements to electronically steer a radiation beam of the phased array antenna 112. The processor 110 (or a dedicated processing device that is separate from a host processor) is coupled to the DBF circuitry 114. The wireless device 100 includes one or more memory devices that store instructions (e.g., array factor processing engine 106) that when executed by the processor 110, cause the processor 110 to perform various operations to compute array factor values for the phased array antenna 112.

In at least one embodiment, the phased array antenna 112 can include a first set of antenna elements that are located on a support structure. The support structure can be a circuit board, such as a PCB, or other structures upon which the antenna elements can be positioned. The first set of antenna elements can be organized as a first lattice or grid, such as illustrated and described herein. It should be noted that a second phased array antenna can be located in a same aperture as the phased array antenna 112. For example, a second set of antenna elements can be co-located with the first set of antenna elements. The first grid can have a first inter-element spacing of a first distance and the second grid can have a second inter-elements spacing of a second distance that is smaller than the first distance. The elements in the different sets can also have different sizes. The sizes and spacing can correspond to wavelengths associated with the respective frequency bands. The second grid can be rotated at a specified angle from the first grid. In at least one embodiment, the first set and/or the second set of antenna elements are constructed with multiple unit cells. Each of the unit cells can include different combinations of antenna elements to make up the one or more phased array antennas. The phased array antenna 112 can be coupled to a radio, including a baseband processor and radio frequency front-end (RFFE) circuitry. Alternatively, the phased array antenna 112 can be coupled to other communication systems, such as RF radios, microwave radios, or other signal sources or receivers.

In at least one embodiment, the array factor processing engine 106 of the processor 110 can receive inputs 111, such as user input or input from an application, calculate array factor values 113 using various techniques described in more detail below, and send the array factor values 113 to the DBF circuitry 114 to control the phased array antenna 112 according to the array factor values 113. In at least one embodiment, the inputs 111 includes an azimuth angle value (phi or Ø), an elevation angle value (theta or θ). For example, an application can determine a coordinate of the wireless device 100 and a coordinate of another device, such as a satellite. The application can determine an angle for the wireless device 100 to communicate with the satellite and the array factor processing engine 106 can receive this angle information as part of the inputs 111. The inputs 111 can also include a value that specifies a distance between antenna elements. In the case of a linear array, a first value can specify a distance between two antenna elements in the linear array. In the case of a planar array, a first value can specify a first distance between two antenna elements in a first dimension and a second value can specify a second distance between two antenna elements in a second dimension. The inputs 111 can also include a value that specifies a wavelength associated with an operating frequency of the phased array antenna 112. The inputs 111 can also include a value that specifies a sampling frequency. In the case of a linear array, a value can specify the sampling frequency in the one dimension of the linear array. In the case of a planar array, a first value can specify a first sampling frequency in a first dimension and a second value can specify a second sampling frequency in a second dimension. In at least one embodiment, the inputs 111 can include a beam pattern, as noted by a main lobe or peak lobe and side lobes. The beam pattern can be a pattern mask that specifies the desired radiation beam and angle and the array factor processing engine 106 can calculate magnitudes and phase values to drive the antenna elements to achieve the desired radiation beam. The output can be a matrix of complex numbers. In at least one embodiment, the inputs 111 can include a matrix of theta angle values and phi angle values and a corresponding magnitude at a given coordinate. The array factor can be a matrix or vector of elements containing a phase value and a magnitude value for each requested three-dimensional coordinate. The array factor is calculated as a function of theta and azimuth coordinates, so its value is bound to a position in three-dimensional space, not a single element on the antenna. The inputs to the array factor equation involve the amplitudes and phases of each of the phased array antenna elements, but the array factor is a function of space, not antenna element positions.

As described above, computing the array factor at many locations in space typically takes a very long time because, at every location in space, a different complicated sum must be computed. The size of this summation grows with the number of antenna elements. This computation can be sped up if the summation is represented by a Fourier Transform. A formula for an inverse Fourier Transform in one dimension is set forth in equation (1) below:

$$X(k) = \frac{1}{M} \sum_{m=1}^{M} Y(m)^{\frac{2\pi i}{M}(m-1)(k-1)} \tag{1}$$

$k = 1, 2, 3, \ldots M - 1, M$, where $M$ is the sampling frequency

The formula for the array factor for a linear array along an x-axis is set forth in equation (2) below:

$$AF(\theta, \emptyset) = \sum_{m=1}^{M} I(m) e^{i[(m-1)(s*d_x*sin(\theta)*cos(\emptyset))+B_{x,m}]} \tag{2}$$

$$0° \le \theta \le 90°, 0° \le \emptyset \le 360°, s = \frac{2\pi}{\lambda} \leftarrow \text{"wave \#"}$$

The formulas are similar, so a specified set of amplitudes for the Fourier Transform can be defined in the array factor processing engine 106 to compute the Fourier Transform with the specified set of amplitudes. The array factor processing engine 106 can perform some additional operations to the Fourier Transform to calculate the array factor at specific locations in space more quickly than nested loop approaches. The Fast Fourier Transform can speed up the computation of the array factor. The type of Fourier Transform used depends on the different use cases, including a linear array in which an inverse one-dimensional Fast Fourier Transform is used, a rectangular array in which an inverse two-dimensional Fast Fourier Transform is used, and a circular array in which an inverse two-dimensional Fast Fourier Transform is used in connection with a masking element for the circular array (or other non-rectangular or linear shapes of arrays). In another embodiment, the computations can be modified for arrays with custom grids (rectangular or circular arrays) with elements placed at grid angles from the x-axis. The custom grids can include triangular grids.

Referring back to equation (1), Y(m) are the Fourier Transform Amplitudes, M is the sampling frequency, and the variable, k, in the Fourier Transform formula can be transformed to the u coordinate space as set forth in the following equation (3):

$$\frac{k-1}{M} = \tag{3}$$

$$\frac{u*d_x}{\lambda} \rightarrow \frac{[0, 1, 2 \ldots M - 1]}{M} = \frac{u*d_x}{\lambda} \rightarrow \frac{\lambda[0, 1, 2 \ldots M - 1]}{d_x M} = u$$

Referring back to equation (2), the variable u can be used to substitute for the expression of sin(θ)*cos(Ø), as set forth in equation (4), which results in the formula in equation (5) for the array factor for a linear array along the x-axis:

$$u = \sin(\theta) * \cos(\emptyset), \quad -1 \leq u \leq 1 \tag{4}$$

$$AF(u) = \tag{5}$$

$$\sum_{m=1}^{M} I(m)e^{i[(m-1)(s*d_x*u)+B_{x,m}]} = \frac{1}{M}\sum_{m=1}^{M} M * I(m) * e^{i*B_{x,m}} * e^{\frac{2\pi i}{\lambda}*(m-1)*u*d_x}$$

where $d_x$ is a spacing between the elements in the x-axis, $\lambda$ is the wavelength associated with an operating frequency of the phased array antenna 112, $B_{x,m}$ is an excitation phase of an $m^{th}$ element, and I(m) is an excitation amplitude of the $m^{th}$ element. As such, the expression $M*I(m)*e^{i*B_{x,m}}$ contains the Fourier Transform Amplitudes that can be used by the Fourier Transform to compute the array factor and the expression $$e^{\frac{2\pi i}{\lambda}*(m-1)*u*d_x}$$

includes the remaining differences between the formulas to be resolved post computation of the IFFT. The array factor processing engine 106 can use equation (3) for these post-IFFT computations.

A formula for an inverse Fourier Transform in the y-axis is set forth in equation (6) below:

$$X(k) = \frac{1}{N}\sum_{n=1}^{N} Y(n)e^{\frac{2\pi i}{N}(n-1)(k-1)} \tag{6}$$

$$k = 1, 2, 3, \ldots N - 1, N, \text{ where } N \text{ is the sampling frequency}$$

The formula for the array factor for a linear array along a y-axis is set forth in equation (7) below:

$$AF(\theta, \emptyset) = \sum_{n=1}^{N} I(n)e^{i[(n-1)(s*d_y*\sin(\theta)*\sin(\emptyset))+B_{y,n}]} \tag{7}$$

$$0° \leq \theta \leq 90°, 0° \leq \emptyset \leq 360°, s = \frac{2\pi}{\lambda} \leftarrow \text{"wave \#"}$$

Referring to equation (6), Y(n) are the Fourier Transform Amplitudes, N is the sampling frequency, and the variable, k, in the Fourier Transform formula can be transformed to the v coordinate space as set forth in the following equation (8):

$$\frac{k-1}{N} = \tag{8}$$

$$\frac{v*d_y}{\lambda} \rightarrow \frac{[0, 1, 2 \ldots N-1]}{N} = \frac{v*d_y}{\lambda} \rightarrow \frac{\lambda[0, 1, 2 \ldots N-1]}{d_y N} = v$$

Referring back to equation (7), the variable v can be used to substitute for the expression of $\sin(\theta)\sin(\emptyset)$, as set forth in equation (9), which results in the formula in equation (10) for the array factor for a linear array along the y-axis:

$$v = \sin(\theta) * \sin(\emptyset), \quad -1 \leq v \leq 1 \tag{9}$$

-continued $$AF(v) = \tag{10}$$

$$\sum_{n=1}^{N} I(n)e^{i[(n-1)(s*d_y*v)+B_{y,n}]} = \frac{1}{N}\sum_{n=1}^{N} N * I(n) * e^{i*B_{y,n}} * e^{\frac{2\pi i}{\lambda}*(n-1)*v*d_y}$$

where $d_y$ is a spacing between the elements in the y-axis, $\lambda$ is the wavelength associated with an operating frequency of the phased array antenna 112, $B_{y,n}$ is an excitation phase of an $n^{th}$ element, and I(n) is an excitation amplitude of the $n^{th}$ element.

As such, the expression $N*I(n)*e^{i*B_{y,n}}$ contains the Fourier Transform Amplitudes that can be used by the Fourier Transform to compute the array factor, and the expression $$e^{\frac{2\pi i}{\lambda}*(n-1)*v*d_y}$$

includes the remaining differences between the formulas to be resolved post computation of the IFFT. The array factor processing engine 106 can use equation (8) for these post-IFFT computations:

In at least one embodiment, the first variable, u, can be used for the coordinate space of a linear array along an x-axis. In this embodiment, the array factor processing engine 106 defines the Fourier transform amplitudes as $M*I(m)*e^{i*B_{x,m}}$ where I(m) is the excitation amplitude of the $m^{th}$ element, $B_{x,m}$ is the excitation phase of the $m^{th}$ element, and M is the sampling frequency of the Fourier Transform. The array factor processing engine 106 computes the Inverse one-dimensional Fast Fourier Transform of this set of special amplitudes. In at least one embodiment where the antenna elements are offset from the x-axis, the array factor processing engine 106 multiplies the resulting values by a skew factor based on the starting positions of the elements. The returned values from the Inverse one-dimensional Fast Fourier Transform correspond to the array factor for the linear array in space at u coordinate values in the u coordinate space per equation (3) above. The array factor processing engine 106 can use spline interpolation or linear interpolation to obtain the array factor at the desired u coordinates and then match these array factor values to their corresponding theta and azimuth values in a physical coordinate system.

In at least one embodiment, the u values (u coordinate value) and their constant resolution depend on a size of M (the sampling frequency) and a ratio $$\frac{\lambda}{d_x}.$$

Increasing M can increase the accuracy of the interpolation, but can also increase execution time by the array factor processing engine 106. In one embodiment of a linear array, the array factor depends on only one variable. The array factor processing engine 106 can perform a one dimensional spline interpolation, instead of a two-dimensional spline interpolation, to speed up computations. Matrix calculations, instead of lengthy nested loops, can be used to create amplitudes and process the results particularly fast. It should be noted that the array factor values at negative coordinate values for u are computed using the periodicity of the discrete Fourier Transform, as described in more detail below.

In at least one embodiment, the second variable, v, can be used for the coordinate space for a linear array along a y-axis. In this embodiment, the array factor processing engine 106 defines the Fourier transform amplitudes as $N*I(n)*e^{i*B_{y,n}}$ where I(n) is the excitation amplitude of the $n^{th}$ element, $B_{y,n}$ is the excitation phase of the $n^{th}$ element, and N is the sampling frequency of the Fourier Transform. The array factor processing engine 106 computes the Inverse one-dimensional Fast Fourier Transform of this set of special amplitudes. In at least one embodiment where the antenna elements are offset from the y-axis, the array factor processing engine 106 multiplies the resulting values by a skew factor based on the starting positions of the elements. The returned values from the Inverse one-dimensional Fast Fourier Transform correspond to the array factor for the linear array in space at v coordinate values in the v coordinate space per equation (8) above. The array factor processing engine 106 can use spline interpolation or linear interpolation to obtain the array factor at the desired v coordinates and then match these array factor values to their corresponding theta and azimuth values in a physical coordinate system.

In at least one embodiment, the v values (v coordinate values) and their constant resolution depend on a size of N (the sampling frequency) and a ratio $$\frac{\lambda}{d_y}.$$

Increasing N can increase the accuracy of the interpolation, but can also increase execution time by the array factor processing engine 106. In one embodiment of a linear array, the array factor depends on only one variable. In this embodiment, the array factor processing engine 106 can perform a one-dimensional spline interpolation, instead of a two-dimensional spline interpolation, to speed up calculations. Matrix calculations, instead of lengthy nested loops, can be used to create amplitudes and process the results particularly fast. It should be noted that the array factor values at negative coordinate values for v are computed using the periodicity of the discrete Fourier Transform, as described in more detail below.

In at least one embodiment, the array factor processing engine 106 can define one or two variables in a two-dimensional coordinate space, such as using a first variable, u, and a second variable, v, in a u-v coordinate space for a planar array along the two axes. A formula for an inverse Fourier Transform in two dimensions is set forth in equation (11) below:

$$X(p, q) = \frac{1}{M}\sum_{m=1}^{M}\frac{1}{N}\sum_{n=1}^{N}Y(m, n)e^{\frac{2\pi i}{M}(m-1)(p-1)}e^{\frac{2\pi i}{N}(n-1)(q-1)} \quad (11)$$

$$p = 1, 2, 3 \ldots M - 1, M \; \& \; q = 1, 2, 3 \ldots N - 1, N$$

The formula for the array factor for a planar array in the x-y plane is set forth in equation (12) below:

$$AF(\theta, \emptyset) = \quad (12)$$

$$\sum_{m=1}^{M}\sum_{n=1}^{N}I(m, n)e^{i[(m-1)(k*d_x*sin(\theta)*cos(\emptyset))+(n-1)(k*d_y*sin(\theta)*sin(\emptyset))+B_{m,n}]}$$

-continued $$0° \leq \theta \leq 90°, 0° \leq \emptyset \leq 360°, k = \frac{2\pi}{\lambda} \leftarrow \text{"wave \#"}$$

The formulas are similar, so a specified set of amplitudes for the Fourier Transform can be defined in the array factor processing engine 106 to compute the Fourier Transform with the specified set of amplitudes. The array factor processing engine 106 can perform some additional operations to the Fourier Transform to calculate the array factor at specific locations in space more quickly than nested loop approaches. The Fast Fourier Transform can speed up the computation of the array factor. The type of Fourier Transform used depends on the different use cases, including a linear array in which an inverse one-dimensional Fast Fourier Transform is used, a rectangular array in which an inverse two-dimensional Fast Fourier Transform is used, and a circular array in which an inverse two-dimensional Fast Fourier Transform is used in connection with a masking element for the circular array (or other non-rectangular or linear shapes of arrays). In another embodiment, the computations can be modified for arrays with custom grids (rectangular or circular arrays) with elements placed at grid angles from the x-axis. The custom grids can include triangular grids.

Referring back to equation (11), Y(m, n) are the Fourier Transform Amplitudes M is a first sampling frequency in a first dimension, N is a second sampling frequency in a second dimension, and the variables, p and q, in the Fourier Transform formula can be transformed to the u-v coordinate space as set forth in the following equations (13):

$$\frac{p-1}{M} = \quad (13)$$

$$\frac{u*d_x}{\lambda} \rightarrow \frac{[0, 1, 2 \ldots M-1]}{M} = \frac{u*d_x}{\lambda} \rightarrow \frac{\lambda[0, 1, 2 \ldots M-1]}{d_x M} = u$$

$$\frac{q-1}{N} = \frac{v*d_y}{\lambda} \rightarrow \frac{[0, 1, 2 \ldots N-1]}{N} = \frac{v*d_y}{\lambda} \rightarrow \frac{\lambda[0, 1, 2 \ldots N-1]}{d_y N} = v$$

Referring back to equation (12), the variables u and v can be used to substitute for the expression of $sin(\theta)*cos(\emptyset)$ and $sin(\theta)*sin(\emptyset)$, as set forth in equation (14), which results in the formula in equation (15) for the array factor for a planar array in the x-y plane:

$$u = sin(\theta)*cos(\emptyset), -1 \leq u \leq 1 \; \& \; v = sin(\theta)*sin(\emptyset), -1 \leq v \leq 1 \quad (14)$$

$$AF(u, v) = \sum_{m=1}^{M}\sum_{n=1}^{N}I(m, n)e^{i[(m-1)(k*d_x*u)+(n-1)(k*d_y*v)+B_{m,n}]} = \quad (15)$$

$$\frac{1}{M}\sum_{m=1}^{M}\frac{1}{N}\sum_{n=1}^{N}(M*N)*I(m, n)e^{iB_{m,n}}e^{\frac{2\pi i}{\lambda}(m-1)(d_x*u)}e^{\frac{2\pi i}{\lambda}(n-1)(d_y*v)}$$

where $d_x$ is a spacing between the elements in the x-axis, where $d_y$ is a spacing between the elements in the y-axis, $\lambda$ is the wavelength associated with an operating frequency of the phased array antenna 112, $B_{m,n}$ is an excitation phase of an $m,n^{th}$ element, and I(m,n) is an excitation amplitude of the $m,n^{th}$ element. As such, the expression $(M*N)*I(m, n)e^{iB_{m,n}}$ contains the Fourier Transform Amplitudes that can be used by the Fourier Transform and the expression $$e^{\frac{2\pi i}{\lambda}(m-1)(d_x*u)}e^{\frac{2\pi i}{\lambda}(n-1)(d_y*v)}$$

includes the remaining differences between the formulas to be resolved post computation of the IFFT. The array factor processing engine 106 can use equations (13) for these post-IFFT computations.

Figures 2A, 2B:
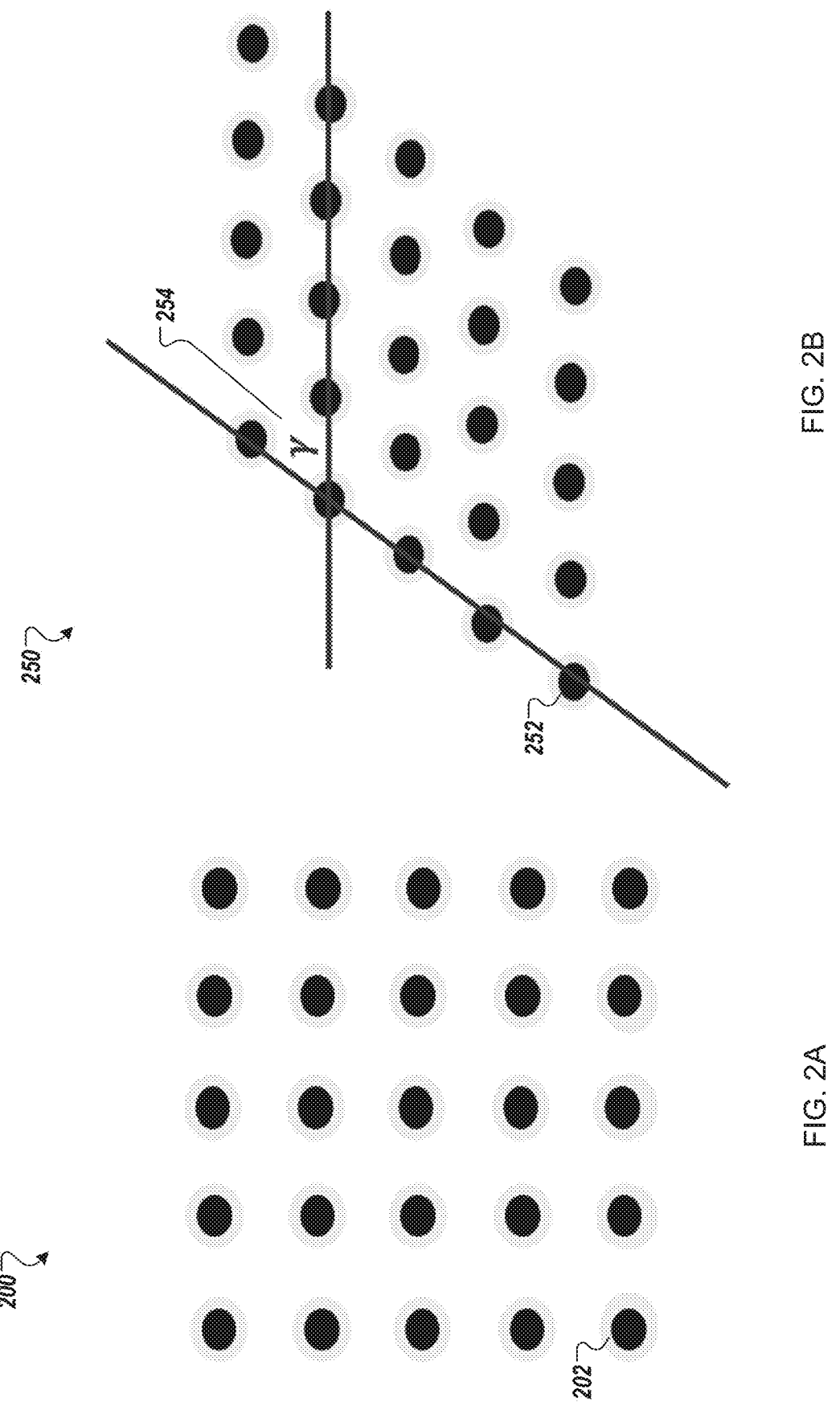
FIG. 2A is an example of a planar array with a rectangular grid where each element is placed at an angle of 90 degrees from the horizontal, according to at least one embodiment.
FIG. 2B is an example of a planar array with a custom grid where elements are placed at a user-defined angle ($\gamma$) from the horizontal, according to at least one embodiment.

In this embodiment, the array factor processing engine 106 defines the Fourier transform amplitudes as $(M*N)*I(m, n)e^{i \ B_{m,n}}$ where $I(m, n)$ is the excitation amplitude of the m, $n^{th}$ element, $B_{m,n}$ is the excitation phase of the m, $n^{th}$ element, M is the sampling frequency of the Fourier Transform in one dimension, and N is the sampling frequency of the Fourier Transform in the second dimension. FIG. 2A is an example of a planar array with a rectangular grid 200 where each element 202 is placed at an angle of 90 degrees from the horizontal, according to at least one embodiment. As described herein, some rectangular grids are custom grids, such as illustrated in FIG. 2B. FIG. 2B is an example of a planar array 250 with a custom grid where elements 252 are placed at a user-defined angle ($\gamma$) 254 from the horizontal, according to at least one embodiment. The array factor processing engine 106 computes the Inverse two-dimensional Fast Fourier Transform of this set of special amplitudes. In at least one embodiment where the antenna elements are offset from the x-axis and y-axis, the array factor processing engine 106 multiplies the resulting values by a skew factor based on the starting positions of the elements. The returned values from the Inverse two-dimensional Fast Fourier Transform correspond to the array factor for the planar array in space at u coordinate values and v coordinate values in the u-v coordinate space per equations (13) above. The array factor processing engine 106 can use spline interpolation or linear interpolation to obtain the array factor at the desired u-y coordinates and then match these array factor values to their corresponding theta and azimuth values in a physical coordinate system.

In at least one embodiment, the u values (u coordinate value) and their constant resolution depend on a size of M (the sampling frequency) and a ratio $$\frac{\lambda}{d_x}$$

and the v values (v coordinate value) and their constant resolution depend on a size of N (the sampling frequency) and a ratio $$\frac{\lambda}{d_y}.$$

Increasing M can increase the accuracy of the interpolation, but can also increase execution time by the array factor processing engine 106. Increasing N can increase the accuracy of the interpolation, but can also increase execution time by the array factor processing engine 106. In one embodiment of a planar array, the array factor depends on two variables, the array factor processing engine 106 can perform a two dimensional spline interpolation. Matrix calculations, instead of lengthy nested loops, can be used to create amplitudes and process the results particularly fast. It should be noted that the array factor values at negative coordinate values for u and v are computed using the periodicity of the discrete two-dimensional Fourier Transform, as described in more detail below. Details of a planar array with custom grids are described below with respect to FIG. 3. It should be noted that the implementation of calculating the array factor for a circular array in the x-y plane uses a modified version of this method as illustrated and described with respect to FIG. 7A-7B.

Figure 3:
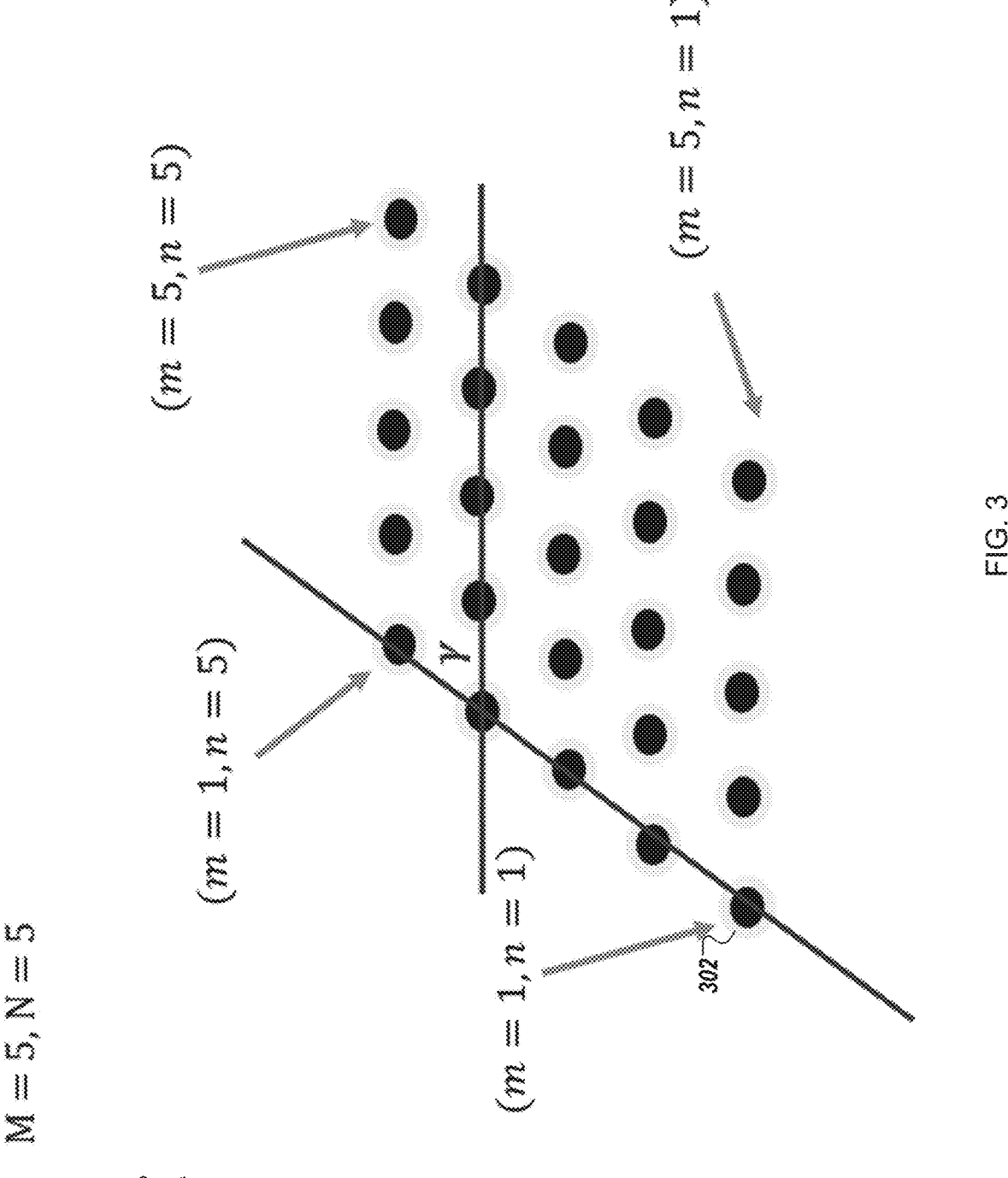
FIG. 3 is a planar array with a custom grid with M elements placed horizontally and N elements placed vertically made up of M*N elements where elements are placed at a user-defined angle ($\gamma$) from the horizontal, according to at least one embodiment.

FIG. 3 is a planar array with a custom grid 300 with M elements placed horizontally and N elements placed vertically made up of M*N elements 302 where elements are placed at a user-defined angle ($\gamma$) from the horizontal, according to at least one embodiment. In this embodiment, each m, $n^{th}$ element is placed on the $m^{th}$ column and $n^{th}$ row as illustrated in FIG. 3. It should be noted that a triangular grid is a specialized custom grid in which $\gamma=60$ and $d_y = d_x * \sin(\gamma)$.

The M*N elements 302 are placed according to equations (16):

$$x_{m,n} = d_x * (m-1) + \frac{d_y * (n-1)}{\tan(\gamma)} \cdot y_{m,n} = d_y * (n-1) \tag{16}$$

As a result, the array factor for a planar array with a custom grid can be expressed in equation (17):

$$AF(u, v) = \tag{17}$$

$$\sum_{m=1}^{M} \sum_{n=1}^{N} I(m, n) e^{i\left[\left(d_x*(m-1) + \frac{d_y*(n-1)}{\tan(\gamma)}\right)(k*u) + (d_y*(n-1))(k*v) + B_{m,n}\right]}$$

Equation (17) can be rearranged so all the factors of m−1 are grouped together and all the factors of n−1 are grouped together, as set forth in equation (18):

$$AF(u, v) = \sum_{m=1}^{M} \sum_{n=1}^{N} I(m, n) e^{i\left[(d_x*(m-1)+(k*u)+(d_y*(n-1))\left(k*\left(v+\frac{u}{\tan(\gamma)}\right)\right)+B_{m,n}\right]} \tag{18}$$

By preforming a transform of $$w = v + \frac{u}{\tan(\gamma)},$$

the array factor can be expressed in equation (19):

$$AF(u, w) = \sum_{m=1}^{M} \sum_{n=1}^{N} I(m, n) e^{i\left[(d_x*(m-1))(k*u) + (d_y*(n-1))(k*w) + B_{m,n}\right]} \tag{19}$$

Equation (19) is identical to equation (15) except the variable v is replaced with the variable w. Thus, the array factor processing engine 106 can compute the array factor for the custom grid 300 in a similar manner as the array with the rectangular grid, but the resulting values of the array factor correspond to different v values than they would be for a rectangular planar array due to using a «-w transformation for the custom grid 300 as opposed to using a u-v transformation for a rectangular grid, such as illustrated in FIG. 2A.

In at least one embodiment, the array factor processing engine 106 can transform the variable p to u and the variable q to v using equations (13) set forth above. In at least one embodiment, the array factor processing engine 106 can transform the variable q to w using equation (20) and transform the variables u and w to v using equation (21):

$$\frac{q-1}{N} = \tag{20}$$

-continued $$\frac{w * d_y}{\lambda} \to \frac{[0, 1, 2 \ldots N - 1]}{N} = \frac{w * d_y}{\lambda} \to \frac{\lambda[0, 1, 2 \ldots N - 1]}{d_y N} = w$$

$$v = w - \frac{u}{\tan(\gamma)} = \frac{\lambda[0, 1, 2 \ldots N - 1]}{d_y N} - \frac{\lambda[0, 1, 2 \ldots M - 1]}{d_x M * \tan(\gamma)} \quad (21)$$

There can be some complexities in computing the array factor for arrays with custom grids. The array factor processing engine 106 can address these complexities as described in more detail below with respect to FIGS. 4A-6C.

Figure 4A:
FIG. 4A shows the (u, v) points in a square for which the array factor is computed by the array factor processing engine for phased arrays with rectangular grids, according to at least one embodiment.
Figure 4A:
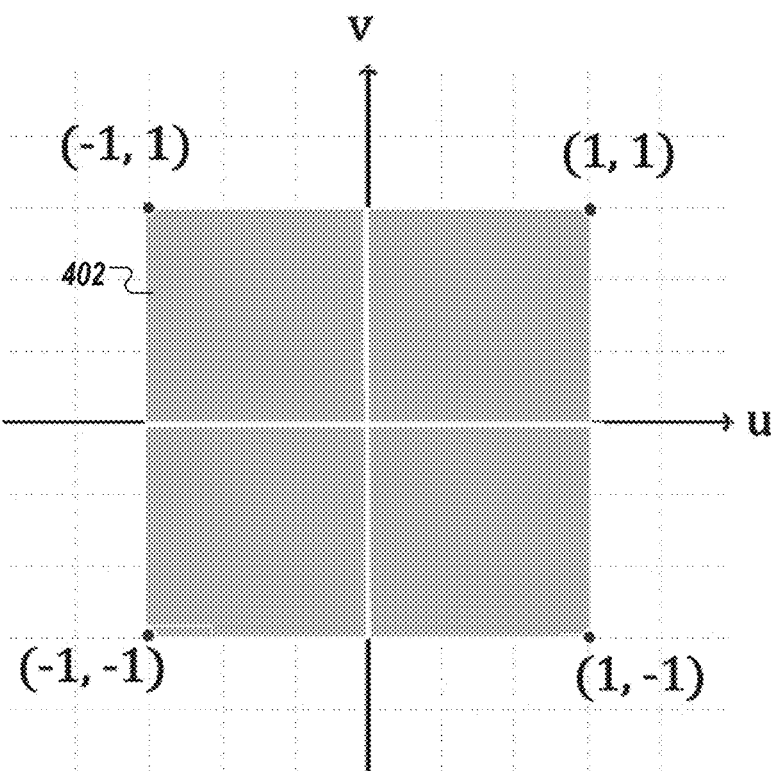

FIG. 4A shows a graph 400 showing the (u, v) points in a square for which the array factor is computed by the array factor processing engine for phased arrays with rectangular grids (e.g., array 200 of FIG. 2A), according to at least one embodiment. In at least one embodiment, the array factor processing engine 106 can use Euler's formula, as expressed in equation (23), to obtain the array factor values for the rest of $$u = \frac{\lambda[-(m - 1) \ldots -2, -1]}{d_x M}$$

and $$v = \frac{\lambda[-(n - 1) \ldots -2, -1]}{d_y N} :$$

$$e^{2\pi i(k-1)} = \cos(2\pi(k - 1)) + i\sin(2\pi(k - 1)) = 1, \text{ where } k \text{ is an integer.} \quad (23)$$

After this, the array factor processing engine 106 can use spline interpolation to compute the array factor at equally spaced theta and azimuth coordinates using the array factor computed for combinations of $$u = \frac{\lambda[-(m - 1), -2, -1, 0, 1, 2 \ldots m - 1]}{d_x M}$$

and $$v = \frac{\lambda[-(n - 1), -2, -1, 0, 1, 2 \ldots n - 1]}{d_y N}.$$

These decisions by the array factor processing engine 106 allow the array factor processing engine 106 to accurately and efficiently interpolate the array factor across the desired region 402.

Figure 4B:
FIG. 4B depicts the (u, w) points in a square for which the array factor is computed by the array factor processing engine for phased arrays with custom grids, according to at least one embodiment.
Figure 4B:
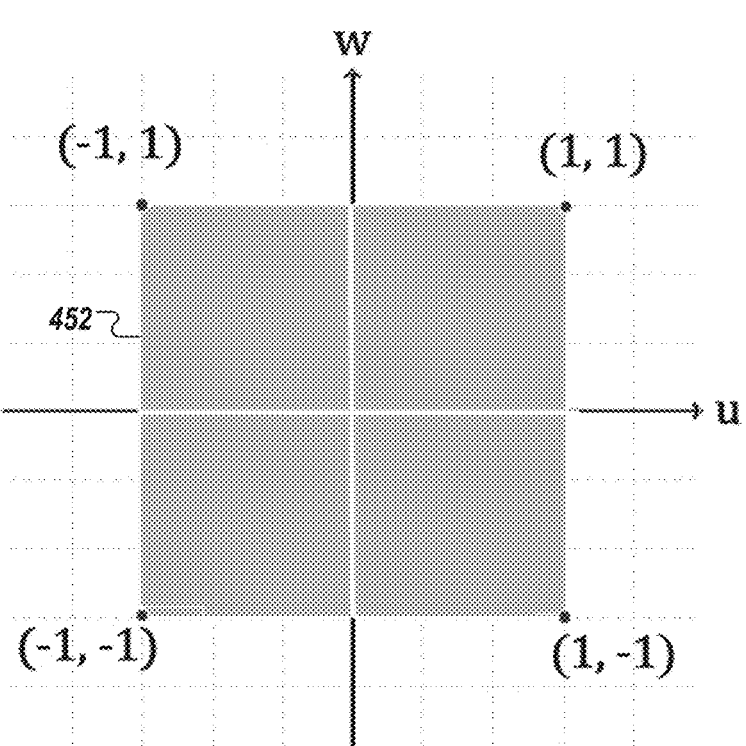

FIG. 4B depicts a graph 450 showing the (u, w) points in the square for which the array factor is computed by the array factor processing engine for phased arrays with custom grids (e.g., array 250 of FIG. 2B), according to at least one embodiment. The array factor processing engine 106 cannot use the equations above to compute the array factor in u, v space, because the v values corresponding to the u and w values in the square 452 lie within the parallelogram illustrated in FIG. 5A that does not cover the entire desired region 452.

Figure 5A:
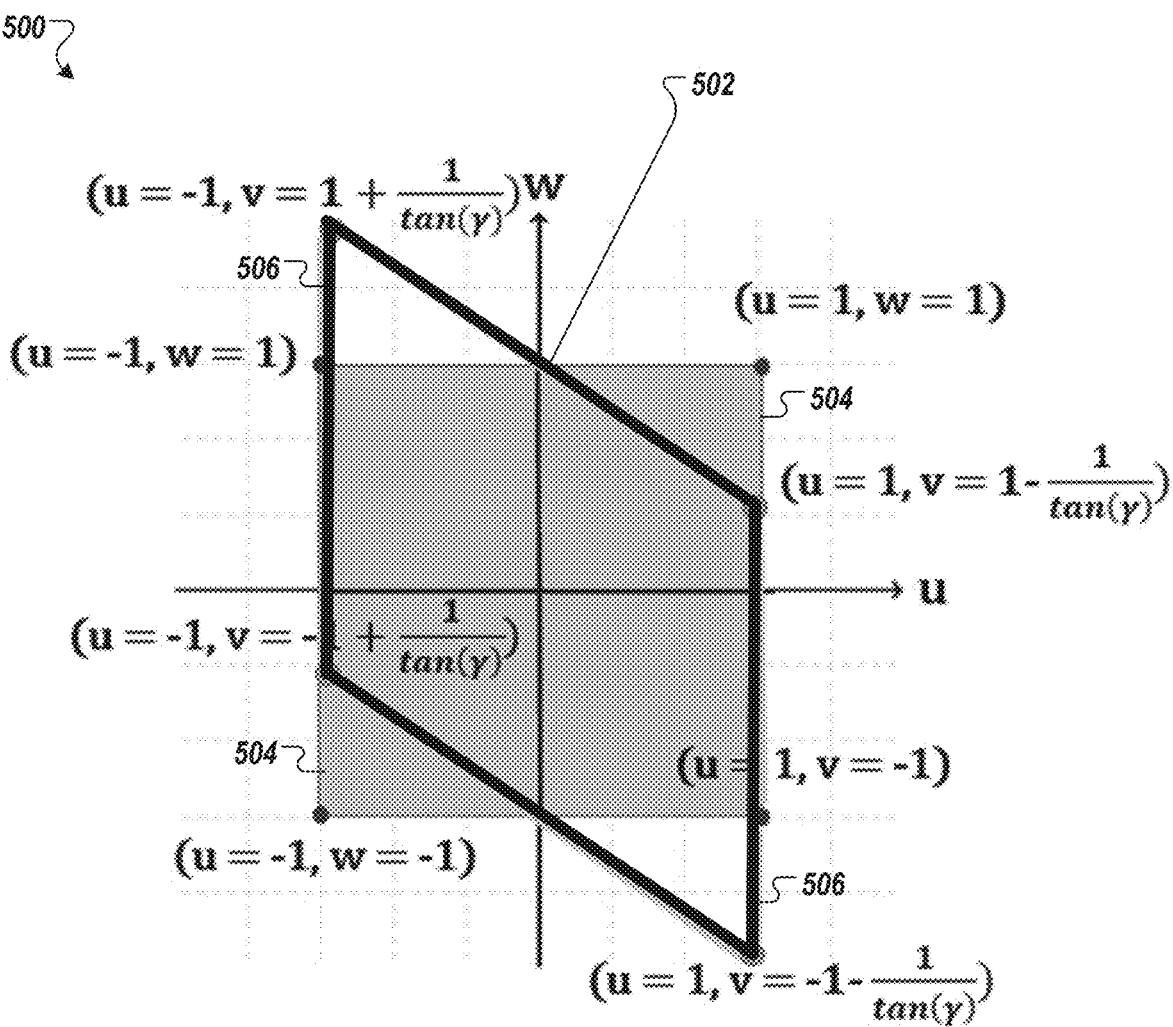
FIG. 5A depicts the (u, w) points in a square and (u, v) points in a parallelogram that does not fully cover the square, according to at least one embodiment.

FIG. 5A depicts a graph 500 showing a square 504 of (u, w) points for which the array factor is computed for an array with a custom grid illustrated in FIG. 3, according to at least one embodiment. In this embodiment, the parallelogram 502 of u, v values corresponding to the u, w values mentioned above is defined in equation (24):

$$-1 - \frac{u}{\tan(\gamma)} \le v \le 1 - \frac{u}{\tan(\gamma)}, \text{ and } -1 \le u \le 1 \quad (24)$$

In this embodiment, the array factor processing engine 106 ends up under interpolating over regions 504 and over interpolating over regions 506. As a result, the array factor processing engine 106 does not compute the array factors across the entire desired region (square region 402), defined by $-1 \le u \le 1$ and $-1 \le v \le 1$. The under and over interpolating results in bad interpolations in the transforms. As illustrated in FIG. 5A, the parallelogram 502 cuts off the square of u, v values.

In at least one embodiment, the array factor processing engine 106 overcomes this challenge by producing a parallelogram in which all the combinations of desired u and v values lie on the parallelogram, as defined by equation (25):

$$-1 - \frac{1}{\tan(\gamma)} - \frac{u}{\tan(\gamma)} \le v \le 1 + \frac{1}{\tan(\gamma)} - \frac{u}{\tan(\gamma)}, \text{ and } -1 \le u \le 1 \quad (25)$$

Figure 5B:
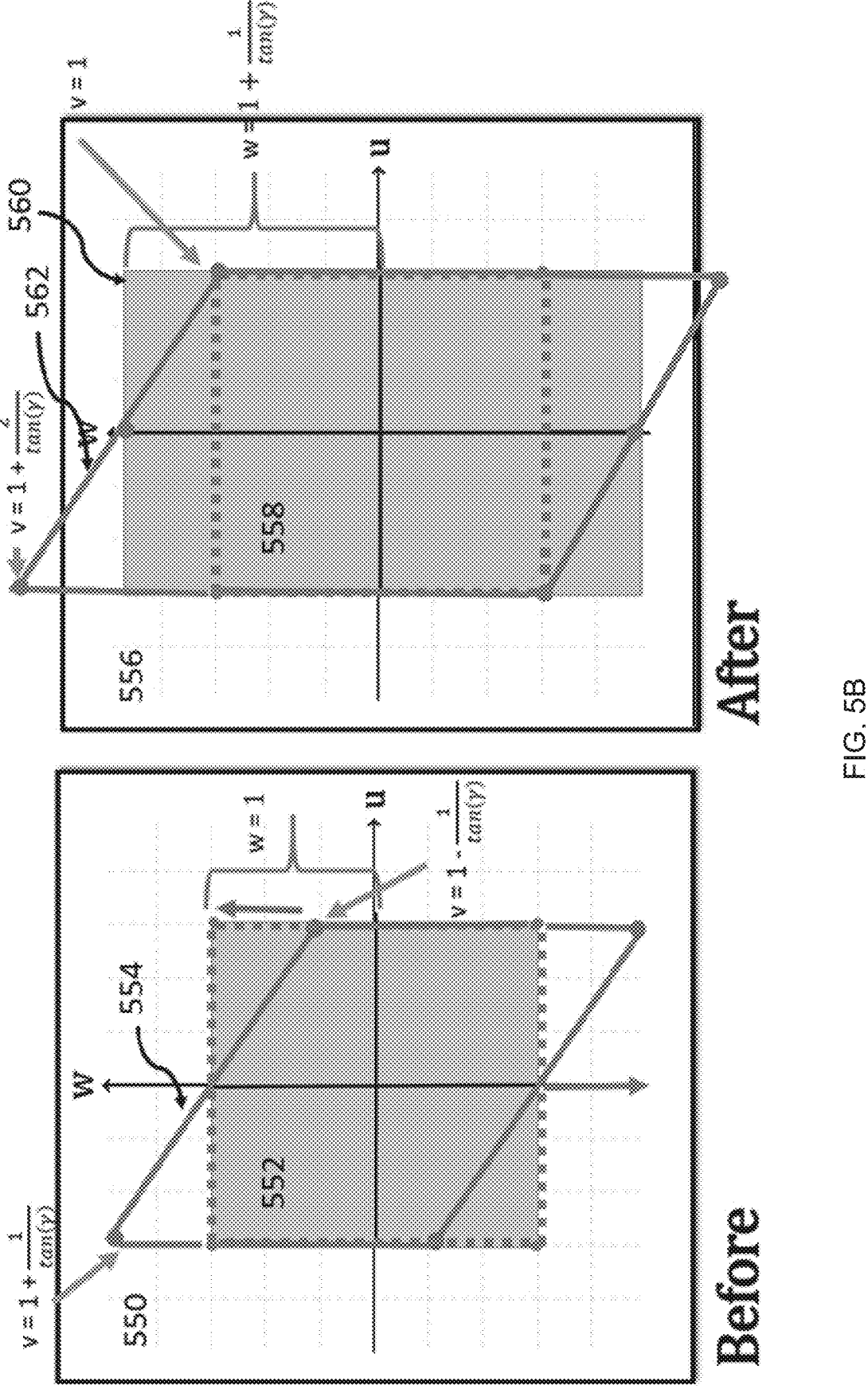
FIG. 5B depicts the (u, w) points in a rectangle that corresponds to (u, v) points on a parallelogram completely covering the square, according to at least one embodiment.

FIG. 5B depicts graphs 550 showing the (u, w) points for which the array factor processing engine 106 computes the array factor for arrays with custom grids, according to at least one embodiment. In at least one embodiment, the array factor processing engine 106 extends the domain of (u, w) points originally within the square 552 to the rectangle 560. The extension generates the parallelogram 562 of (u, v) points, which contains (u, v) points in the square 558 as well as extraneous (u, v) points outside of this square. To improve the efficiency of interpolation, array factors for (u, v) points outside the square 558 are discarded. In at least one embodiment, the array factor processing engine 106 chooses to use the value of n that satisfies equation (26) and discards all w values produced from larger n that result in v>1 at u=1 for interpolation:

$$v = \frac{\lambda[n - 1]}{d_y N} - \frac{1}{\tan(\gamma)} \approx 1 \to \frac{\lambda[n - 1]}{d_y N} \approx 1 + \frac{1}{\tan(\gamma)} \quad (26)$$

The array factor processing engine 106 can compute the array factor over the rectangle 560 described by the inequality $$-1 \le u \le 1 \text{ and } -1 - \frac{1}{\tan(\gamma)} \le w \le 1 + \frac{1}{\tan(\gamma)}$$

to interpolate the array factor within the square 402 described by the inequalities $-1 \le u \le 1$ and $-1 \le v \le 1$. This allows the parallelogram 562 of (u, v) points to cover the square 558 mentioned above.

It should be noted that the square in FIG. 5A corresponds to (u, w) values denoted by the axes. The parallelogram in FIG. 5A, on the other hand, corresponds to (u, v) values, and v is not on any of the axes of the figure. FIG. 5B shows extending the (u, w) values, so that the corresponding (u, v) values cover the full square. FIG. 5B shows that (u, w) values on the extended rectangle (with both u and w denoted by the axes) correspond to (u, v) values on the hollow parallelogram that fully covers the 1-by-1 square. The goal of this extension is to solve the array factor for (u, v) values on this 1-by-1 square by using (u, w) values on the extended rectangle in FIG. 5B. The transformation from (u, w) to (u, v) results in a parallelogram of (u, v) values. Only the (u, v) values inside the square are used, which shows that it is okay to produce slightly more array factor values than to under produce them for the purpose of interpolation as extra values can be discarded, but missing values can harm the accuracy and completeness of interpolation.

As noted above, n needs to be equal to or less than N in the equations above. However, equation (26) only has one solution for n, given that the other variables in equation (26) are fixed. For example, in a case where $$\frac{\lambda}{d_y} = 1$$

and tan($\gamma$)=0.5, then the right-hand side of equation (26) becomes $$I + \frac{1}{\tan(\gamma)} = 3.$$

Solving for n on the left-hand side of equation (26) results in n=3N+1. However, n=3N+1>N, which does not meet the initial condition that n needs to be equal to or less than N.

In at least one embodiment, the array factor processing engine 106 overcomes this challenge by inserting "phantom" elements and finding a new distance, d_y, as illustrated below with respect to FIGS. 6A-6C.

Figures 6A, 6B:
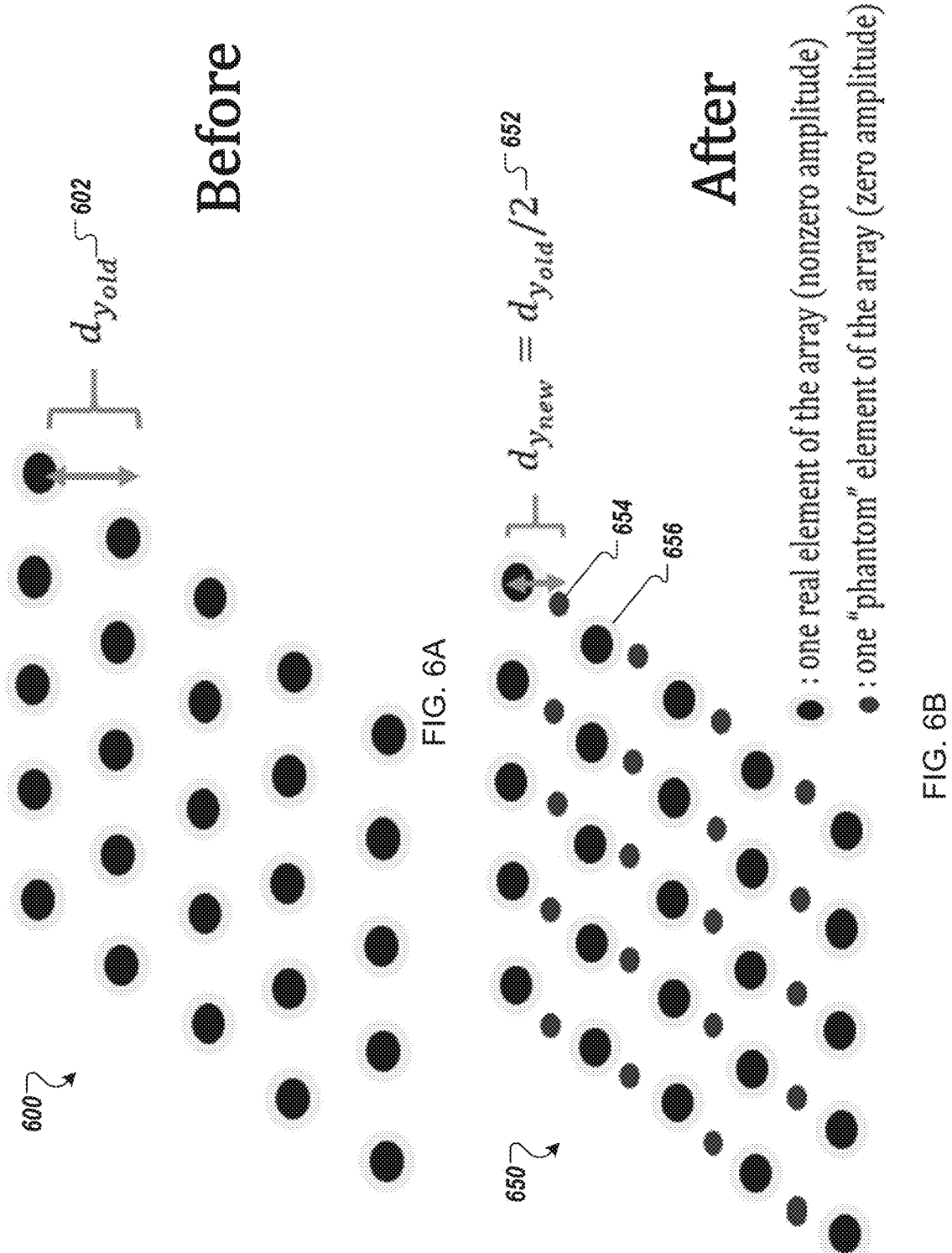
FIG. 6A depicts an array with a custom grid with an initial distance between real elements, according to at least one embodiment.
FIG. 6B depicts an array with a custom grid with a distance between real elements and phantom elements within the real elements, according to at least one embodiment.
Figure 6C:
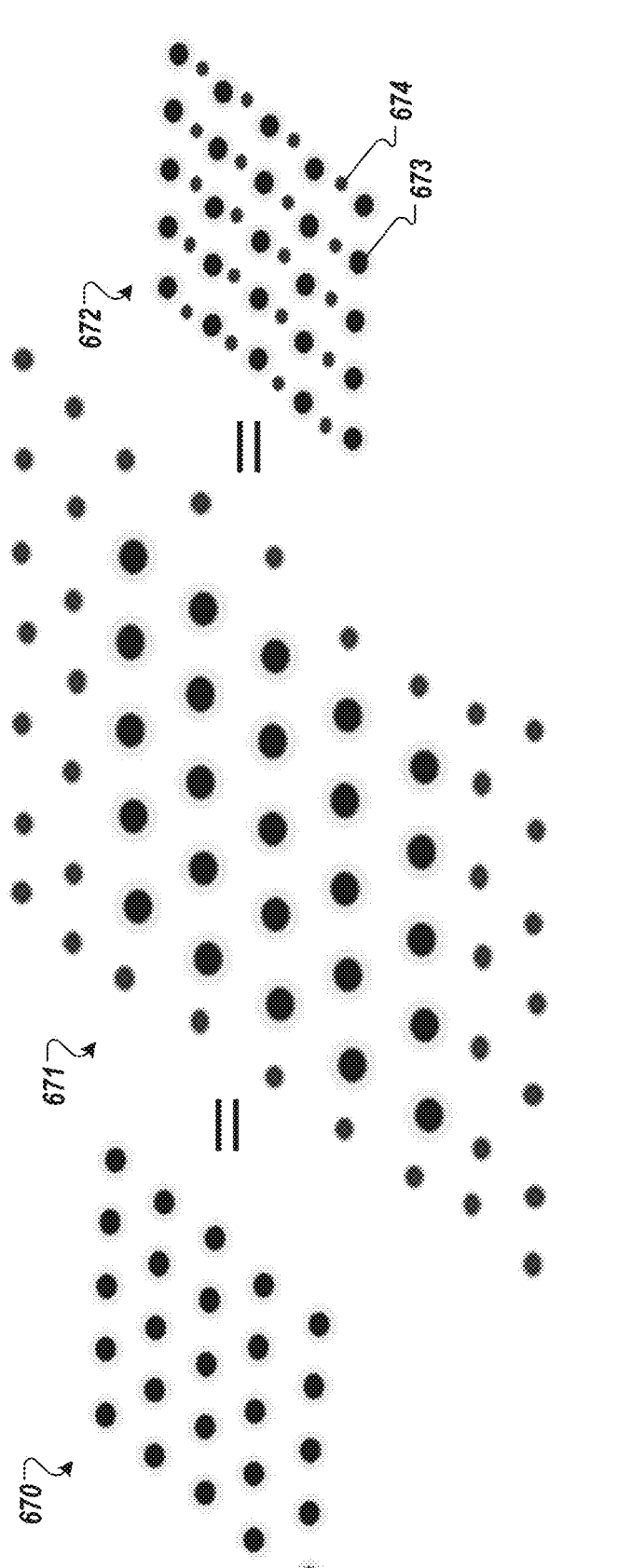
FIG. 6C depicts an array with a custom grid, the same array represented with phantom elements outside the real elements, and the same array represented with phantom elements repositioned within the real elements, according to at least one embodiment.

FIG. 6A depicts an array with a custom grid 600 with an initial distance 602 between real elements, according to at least one embodiment. As described herein, the initial distance 602 can be used in the equation $$n = \frac{d_y N}{\lambda}\left[1 + \frac{1}{\tan(\gamma)}\right] + 1 \ \& \ n \leq N,$$

where N is the largest n that can be used. For a given array, there may not be a satisfying n where n is less than or equal to N. In this case, the array factor processing engine 106 can set n equal to N and solve for a new distance 652 $d_{y_{new}}$ that satisfies this choice of n. The new distance 652 $d_{y_{new}}$ can be expressed as a whole number fraction of the initial distance (e.g., $d_{y_{new}} = d_{y_{old}}/2$). Once the new distance 652 is determined, the array factor processing engine 106 can insert phantom elements 654 of zero amplitude between real elements 656 to satisfy the new distance 652, as illustrated in FIG. 6B. FIG. 6B depicts an array with a custom grid 650 with a distance 652 between real elements 656 and phantom elements 654 within the real elements 656, according to at least one embodiment.

In at least one embodiment, the sampling frequency, N, is maintained to ensure execution time does not increase. This concept is equivalent to moving the zero padding already present in the Fourier Transform to in between the elements of nonzero amplitudes as illustrated by FIG. 6C. Because the sampling frequency is always greater than the number of real elements on an axis when phantom elements are used, the array factor processing engine 106 already uses zero padding and can strategically reposition the zero amplitudes rather than multiply the sampling frequency by a whole number, which would have slowed down the array factor calculations. As illustrated in FIG. 6B, the phantom elements 654 are located in between the real elements 656, instead of outside of the real elements as illustrated in 671 of FIG. 6C. FIG. 6C depicts an array with a custom grid 670, the same array represented with phantom elements outside the real elements 671, and the same array 670 represented with phantom elements 674 repositioned within the real elements 673, according to at least one embodiment. The representation 671 of array 670 illustrates traditional zero padding techniques while the representation 672 of the array 670 illustrates how the array processing engine 106 solves the under interpolation problem efficiently by manipulating these techniques, according to at least one embodiment. In particular, the array factor processing engine uses a new form of zero padding to solve the under interpolation problem described herein. The array 670 shows the actual physical phased array antenna composed of the real elements. The array 671 shows what conventional zero padding does. It represents the phased array 670 as a phased array with real elements with nonzero amplitudes in the locations of the physical elements and "phantom" elements in the area surrounding the real elements. The array factor processing engine, instead of increasing the sampling frequency N, takes the zero padding already present in the array 671, and moves the zeros or "phantom" elements in-between the real elements. This new technique is illustrated in the array 672. In another embodiment, the array factor processing engine could increase the sampling frequency N and keep the zeros outside the real elements and add more zeros inside the real elements, which can slow down the processing.

It should be noted that these modifications can improve the completeness of interpolation in some cases without increasing the execution time of the engine. In FIG. 6B, the zeros were moved to in-between the elements to falsely reduce dy. The engine represents the antenna in FIG. 6A as an antenna with "phantom" elements in-between the real elements as shown in FIG. 6B to achieve certain guarantees about the resulting interpolation. On the other hand, traditional zero padding would pad nonzero amplitudes with zero amplitudes around the border of the matrix of real values. Furthermore, because the nonzero Fourier transform amplitudes correspond to real phased array antenna amplitudes, the zeros in the zero padding must correspond to elements with zero amplitude (or "phantom" elements) since the IFFT is being used to represent values belonging to a physical object, namely a phased array and all its elements.

In the various embodiments described above, the array factor processing engine 106 can calculate the array factors at a specified set of u and v values or $\theta$ and Ø values. In another embodiment, the array factor processing engine 106 can receive the desired array factor at a specified set of u and v values and can compute the amplitudes given the phase excitations using a one-dimensional or two-dimensional Fast Fourier Transform. In other words, the array factor processing engine 106 can quickly solve the reverse problem of antenna synthesis given the desired array factors in addition to the forward problem of array factor computation from the given antenna. In at least one embodiment, the array factor processing engine 106 can provide a graphical user interface for allowing a user to easily set resolutions and other parameters of these computations. In another embodiment, the array factor processing engine 106 can provide a graphical user interface to receive the desired array factor at the specific set of u and v values and can calculate the amplitudes given the phases/delays to be applied to the antenna elements at the DBF circuitry.

In at least one embodiment, the array factor processing engine 106 is implemented as a design tool for antenna design and simulation. In at least one embodiment, the array factor processing engine 106 can be used in a customer terminal, a satellite, or other devices containing a phased array antenna for which the array factor is used.

In at least one embodiment, the array factor processing engine 106 can calculate the array Cfactor for a circular array in the x-y plane. The array factor processing engine 106 can create a rectangular planar array that covers the circular array in the x-y plane and can create a condition that specifies the size or boundaries of the circular array. For example, the condition can specify an equation of a circle, such as in equation (27):

$$x^2 + y^2 \leq r^2 \qquad (27)$$

where (x, y) is the position of the element and r is the radius of the circular array.

In at least one embodiment, the condition can be considered to be an element mask that is used to mask elements that do not satisfy the condition. The element mask can set the excitation amplitude of each element that does not satisfy the condition to zero and leave amplitudes of the remaining elements as nonzero. After masking the elements that do not satisfy the condition, the array factor processing engine 106 can calculate the array factor in a similar manner as the planar array in the x-y plane as described above.

Figure 7A:
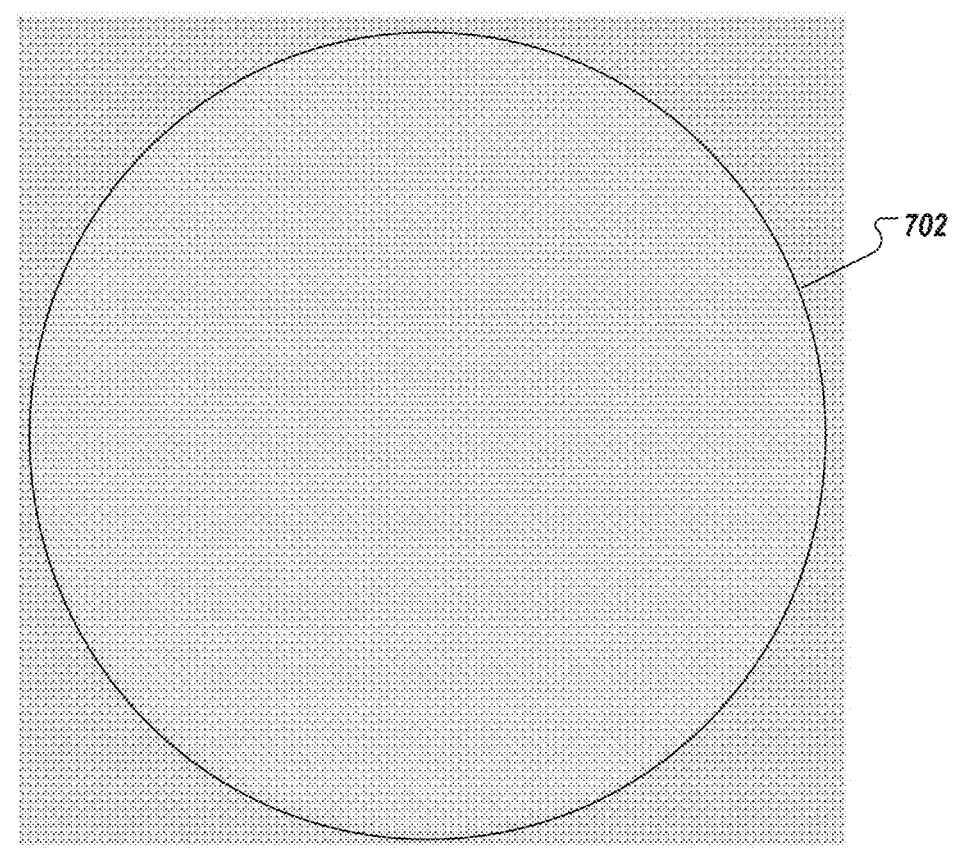
FIG. 7A depicts a circular array in the X-Y plane with nonzero excitation amplitudes inside the element mask and zero excitation amplitudes outside the element mask, according to at least one embodiment.
Figure 7B:
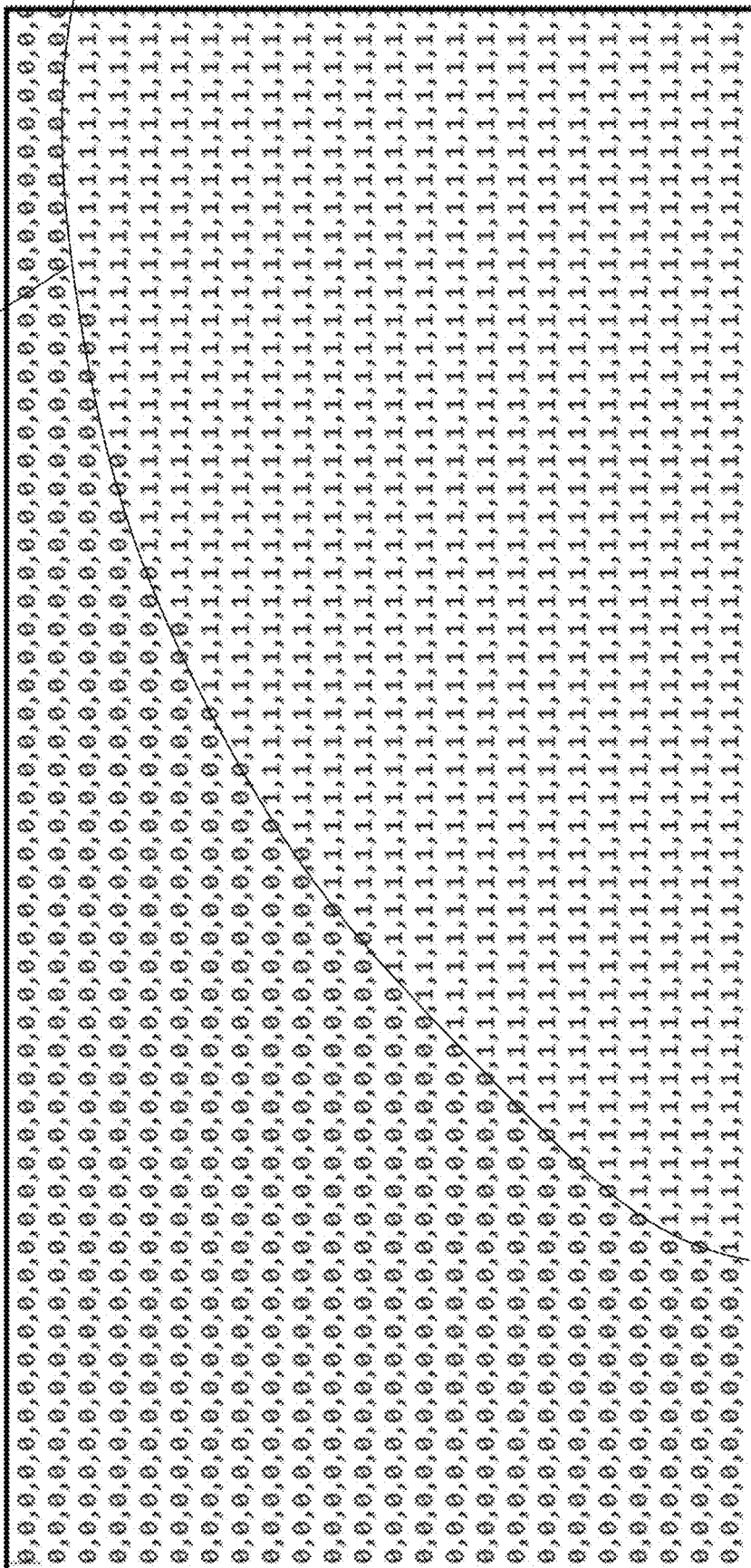
FIG. 7B is a close-up view of FIG. 7A depicting nonzero excitation amplitudes inside the element mask and zero excitation amplitudes outside the element mask, according to at least one embodiment.

FIG. 7A depicts a circular array 700 in the X-Y plane with nonzero excitation amplitudes inside the element mask 702 and zero excitation amplitudes outside the element mask, according to at least one embodiment. FIG. 7B is a close-up view of FIG. 7A depicting nonzero excitation amplitudes inside the element mask 702 and zero excitation amplitudes outside the element mask, according to at least one embodiment. As illustrated in FIG. 7B, the zero excitation amplitudes are used outside the element mask 702 and nonzero excitation amplitudes that are inside the element mask 702 are kept unchanged. There are zeros on the outside for elements that do not fall within the element mask 702 and there are ones on the inside for elements that fall within the element mask 702.

As described above, the Discrete Fourier Transform is periodic with respect to the sampling frequency as noted in Euler's Formula in equation (23) set forth above. Thus, from the Inverse Fast Fourier Transforms (one-dimensional or two-dimensional), the following equation (28) for the linear case and equation (29) for the planar case are known:

$$X(-k) = X(-k + M) = X(M - k) \text{ where } M - k > 0 \qquad (28)$$

$$X(-p, -q) = X(-p + M, -q + N) = X(M - p, N - q) \text{ where } M - p, \qquad (29)$$
$$N - q > 0$$

Because the Fourier Transform for inputs −k, −p, and −q can be calculated using the Fourier Transform for positive inputs, the array factor processing engine 106 can calculate the array factor for negative u and negative v values by using the inverse Fourier Transform's results for positive u and positive v values.

As described above, the antenna elements can be offset from the origin in the x-axis, y-axis, or both. As described above, the resulting values from the Fourier Transform can be multiplied by a skew factor based on the starting positions of the elements, as described below with respect to FIGS. 8A-9B.

Figure 8A:
FIG. 8A is an x-aligned linear array that is not positioned at the origin with elements starting at $x_0$, according to at least one embodiment.
Figure 8A:
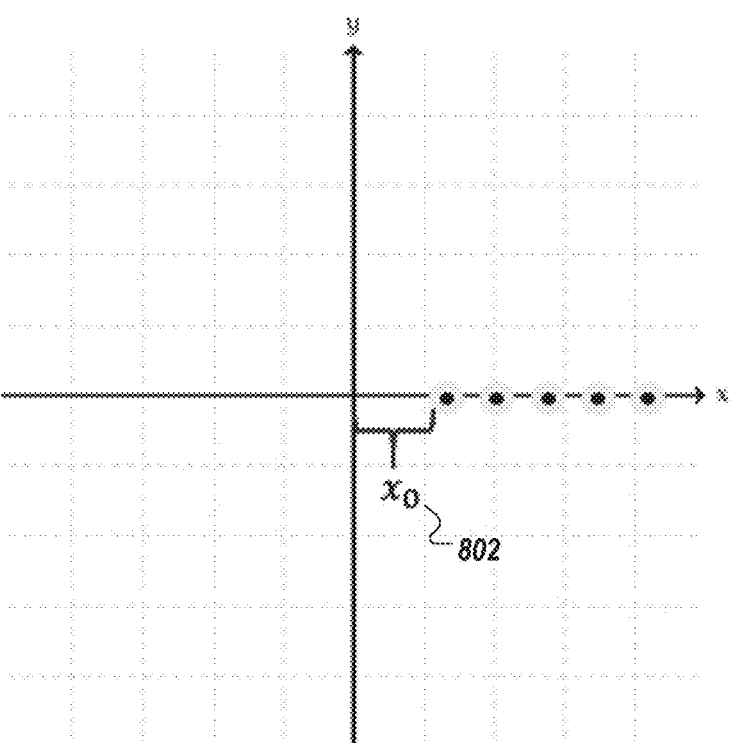

FIG. 8A is an x-aligned linear array 800 that is not positioned at the origin with elements starting at $x_0$ 802, according to at least one embodiment. For the x-aligned linear array 800, the elements are placed according to equation (30):

$$x_m = (m - 1)(d_x) + x_0 \qquad (30)$$

The array factor can be expressed in equations (31) for the x-aligned linear array 800:

$$AF(u) = \sum_{m=1}^{M} I(m) \qquad (31)$$

$$e^{i[((m-1)(d_x)+x_0)*s*u)+B_{x,m}]} = \sum_{m=1}^{M} I(m)e^{i[(m-1)(d_x)*s*u)+B_{x,m}]} * e^{i*s*u*x_0} =$$

$$e^{i*s*u*x_0} * \sum_{m=1}^{M} I(m)e^{i[(m-1)(d_x)*s*u)+B_{x,m}]}$$

In the last equation, the summation expression is the original equation for the array factor of a linear array starting at the origin. The remaining expression is considered a skew factor that can be multiplied after the summation is determined. In at least one embodiment, the array factor processing engine 106 computes the array factor in the same way as an x-aligned linear array starting at the origin. For each u value for which the array factor is computed, the array factor processing engine 106 multiplies the result by the skew factor ($e^{i*s*u*x_0}$), and proceeds in a similar manner as the linear array started at the origin.

Figure 8B:
FIG. 8B is a y-aligned linear array that is not positioned at the origin with elements starting at $y_0$, according to at least one embodiment.
Figure 8B:
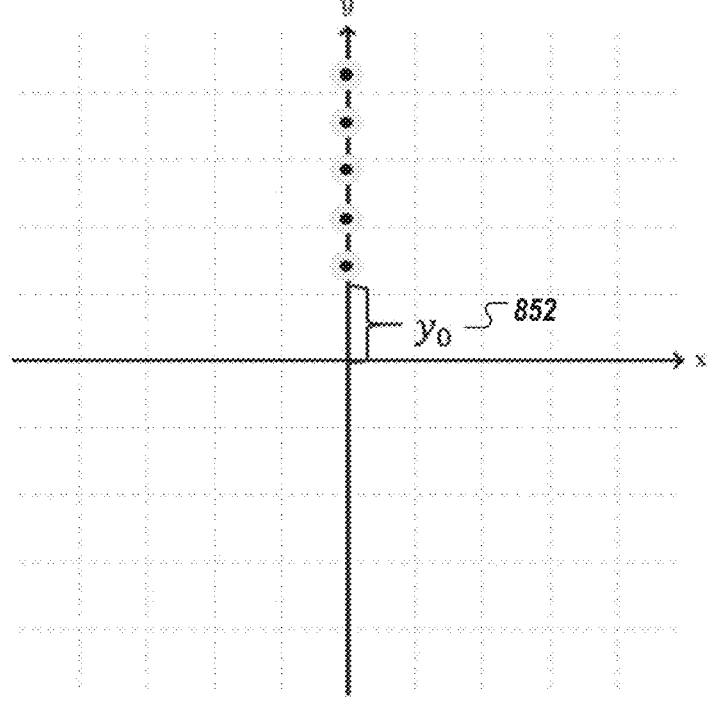

FIG. 8B is a y-aligned linear array 850 that is not positioned at the origin with elements starting at $y_0$ 852, according to at least one embodiment. For the y-aligned linear array 850, the elements are placed according to equation (31):

$$y_n = (n - 1)(d_y) + y_0 \qquad (31)$$

The array factor can be expressed in equations (32) for the y-aligned linear array 850:

$$AF(v) = \qquad (32)$$

$$\sum_{n=1}^{N} I(n)e^{i[((n-1)(d_y)+y_0)*s*v)+B_{y,n}]} = \sum_{n=1}^{N} I(n)e^{i[(n-1)(d_y)*s*v)+B_{y,n}]} * e^{i*s*v*y_0} =$$

$$e^{i*s*v*y_0} * \sum_{n=1}^{N} I(n)e^{i[(n-1)(d_y)*s*v)+B_{y,n}]}$$

In the last equation, the summation expression is the original equation for the array factor of a linear array starting at the origin. The remaining expression is considered to be a skew factor that can be multiplied after the summation is determined. In at least one embodiment, the array factor processing engine 106 computes the array factor in the same way as a y-aligned linear array starting at the origin. For each v value for which the array factor is computed, the array factor processing engine 106 multiplies the result by the skew factor ($e^{i*s*v*y_0}$), and proceeds in a similar manner as the linear array started at the origin.

FIG. 9A is a rectangular array 900 with elements starting at ($x_0$, $y_0$) 902, according to at least one embodiment. For the rectangular array 900, the elements are placed according to equation (33):

$$x_m = (m-1)(d_x) + x_0, \; y_n = (n-1)(d_y) + y_0 \qquad (33)$$

The array factor can be expressed in equations (34) for the rectangular array 900:

$$AF(u,v) = \qquad (34)$$
$$\sum_{m=1}^{M}\sum_{n=1}^{N} I(m,n)e^{i\left[((m-1)(d_x)+x_0)(k*u)+((n-1)(d_y)+y_0)(k*v)+B_{m,n}\right]} =$$
$$\sum_{m=1}^{M}\sum_{n=1}^{N} I(m,n)$$
$$e^{i\left[(m-1)(k*d_x*u)+(n-1)(k*d_y*v)+B_{m,n}\right]}*e^{i*k*u*x_0}*e^{i*k*v*y_0} =$$
$$e^{i*k*u*x_0}*e^{i*k*v*y_0}*\sum_{m=1}^{M}\sum_{n=1}^{N} I(m,n)e^{i\left[(m-1)(k*d_x*u)+(n-1)(k*d_y*v)+B_{m,n}\right]}$$

In the last equation, the summation expression is the original equation for the array factor of a planar array starting at the origin. The remaining expression is considered a skew factor that can be multiplied after the summation is determined. In at least one embodiment, the array factor processing engine 106 computes the array factor in the same way as a planar array starting at the origin. For each pair of (u, v) values for which the array factor is computed, the array factor processing engine 106 multiplies the result by the skew factor ($e^{i*k*u*x_0}*e^{i*k*v*y_0}$), and proceeds in a similar manner as the phased array started at the origin.

FIG. 9B is a circular array 950 with elements starting at ($x_0$, $y_0$), according to at least one embodiment. The circular array 950 is created using a rectangular array with an element mask 952 as a circle. In this embodiment, the starting x and y values of the circular array 950 are the starting x and y values of the rectangular array that is masked to create the circular array 950. Similar techniques of multiplying by the skew factor and inserting zero amplitudes for elements that do not meet the condition of the element mask can be used to calculate the array factors for the circular array 950.

Figure 10:
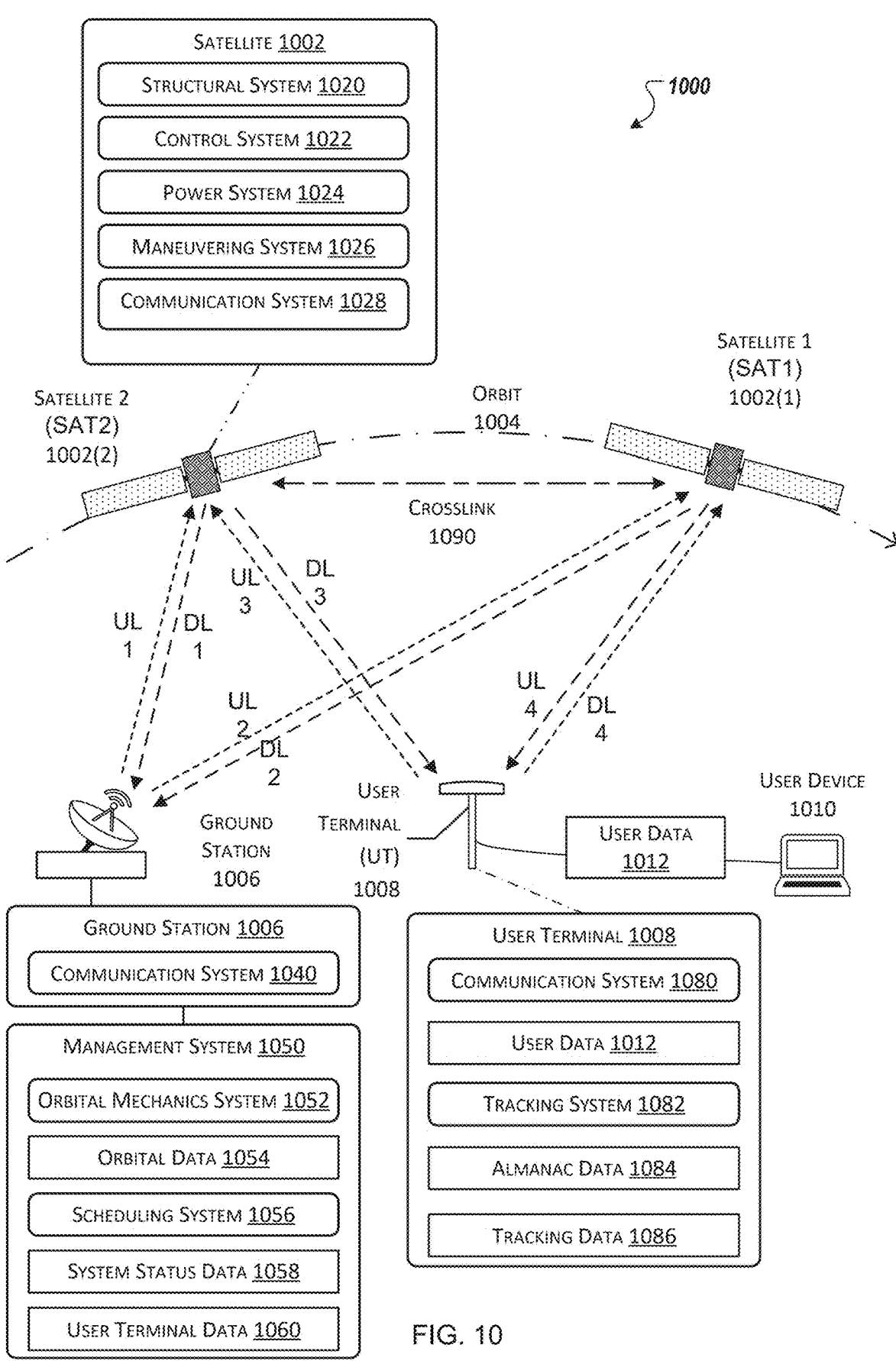
FIG. 10 illustrates a portion of a communication system that includes two satellites of a constellation of satellites, each satellite being in orbit, according to embodiments of the present disclosure.

FIG. 10 illustrates a portion of a communication system 1000 that includes two satellites of a constellation of satellites 1002(1), 1002(2), . . . , 1002(S), each satellite 1002 being in orbit 1004 according to embodiments of the present disclosure. The communication system 1000 shown here comprises a plurality (or "constellation") of satellites 1002(1), 1002(2), . . . , 1002(S), each satellite 1002 being in orbit 1004. Any of the satellites 1002 can include the communication system described herein. Also shown is a ground station 1006, user terminal (UT) 1008, and a user device 1010.

The constellation may comprise hundreds or thousands of satellites 1002, in various orbits 1004. For example, one or more of these satellites 1002 may be in non-geosynchronous orbits (NGOs) in which they are in constant motion with respect to the Earth. For example, orbit 1004 is a low-Earth orbit (LEO). In this illustration, orbit 1004 is depicted with an arc pointed to the right. A first satellite (SAT1) 1002(1) is leading (ahead of) a second satellite (SAT2) 1002(2) in the orbit 1004.

Satellite 1002 may comprise a structural system 1020, a control system 1022, a power system 1024, a maneuvering system 1026, and a communication system 1028 described herein. In other implementations, some systems may be omitted, or other systems added. One or more of these systems may be communicatively coupled with one another in various combinations.

The structural system 1020 comprises one or more structural elements to support the operation of satellite 1002. For example, the structural system 1020 may include trusses, struts, panels, and so forth. The components of other systems may be affixed to, or housed by, the structural system 1020. For example, the structural system 1020 may provide mechanical mounting and support for solar panels in the power system 1024. The structural system 1020 may also provide thermal control to maintain components of the satellite 1002 within operational temperature ranges. For example, the structural system 1020 may include louvers, heat sinks, radiators, and so forth.

The control system 1022 provides various services, such as operating the onboard systems, resource management, providing telemetry, processing commands, and so forth. For example, the control system 1022 may direct the operation of the communication system 1028.

The power system 1024 provides electrical power for the operation of the components onboard satellite 1002. The power system 1024 may include components to generate electrical energy. For example, the power system 1024 may comprise one or more photovoltaic cells, thermoelectric devices, fuel cells, and so forth. The power system 1024 may include components to store electrical energy. For example, the power system 1024 may comprise one or more batteries, fuel cells, and so forth.

The maneuvering system 1026 maintains the satellite 1002 in one or more of a specified orientation or orbit 1004. For example, the maneuvering system 1026 may stabilize satellite 1002 with respect to one or more axis. In another example, the maneuvering system 1026 may move the satellite 1002 to a specified orbit 1004. The maneuvering system 1026 may include one or more computing devices, sensors, thrusters, momentum wheels, solar sails, drag devices, and so forth. For example, the sensors of the maneuvering system 1026 may include one or more global navigation satellite system (GNSS) receivers, such as global positioning system (GPS) receivers, to provide information about the position and orientation of satellite 1002 relative to Earth. In another example, the sensors of the maneuvering system 1026 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 1028 provides communication with one or more other devices, such as other satellites 1002, ground stations 1006, user terminals 1008, and so forth. The communication system 1028 may include one or more modems, digital signal processors, power amplifiers, antennas (including at least one antenna that implements multiple antenna elements, such as a phased array antenna, and including an embedded calibration antenna, such as the calibration antenna 1004 as described herein), processors, memories, storage devices, communications peripherals, interface buses, and so forth. Such components support communications with other satellites 1002, ground stations 1006, user terminals 1008, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1028 may be output to other systems, such as to the control system 1022, for further processing. Output from a system, such as the control system 1022, may be provided to the communication system 1028 for transmission.

One or more ground stations 1006 are in communication with one or more satellites 1002. The ground stations 1006 may pass data between the satellites 1002, a management system 1050, networks such as the Internet, and so forth. The ground stations 1006 may be emplaced on land, on vehicles, at sea, and so forth. Each ground station 1006 may comprise a communication system 1040. Each ground station 1006 may use the communication system 1040 to establish communication with one or more satellites 1002, other ground stations 1006, and so forth. The ground station 1006 may also be connected to one or more communication networks. For example, the ground station 1006 may connect to a terrestrial fiber optic communication network. The ground station 1006 may act as a network gateway, passing user data 1012 or other data between the one or more communication networks and the satellites 1002. Such data may be processed by the ground station 1006 and communicated via the communication system 1040. The communication system 1040 of a ground station may include components similar to those of the communication system 1028 of a satellite 1002 and may perform similar communication functionalities. For example, the communication system 1040 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 1006 are in communication with a management system 1050. The management system 1050 is also in communication, via the ground stations 1006, with the satellites 1002 and the UTs 1008. The management system 1050 coordinates the operation of the satellites 1002, ground stations 1006, UTs 1008, and other resources of the communication system 1000. The management system 1050 may comprise one or more of an orbital mechanics system 1052 or a scheduling system 1056. In some embodiments, the scheduling system 1056 can operate in conjunction with an HD controller.

The orbital mechanics system 1052 determines orbital data 1054 that is indicative of a state of a particular satellite 1002 at a specified time. In one implementation, the orbital mechanics system 1052 may use orbital elements that represent characteristics of the orbit 1004 of the satellites 1002 in the constellation to determine the orbital data 1054 that predicts location, velocity, and so forth of particular satellites 1002 at particular times or time intervals. For example, the orbital mechanics system 1052 may use data obtained from actual observations from tracking stations, data from the satellites 1002, scheduled maneuvers, and so forth to determine the orbital elements. The orbital mechanics system 1052 may also consider other data, such as space weather, collision mitigation, orbital elements of known debris, and so forth.

The scheduling system 1056 schedules resources to provide communication to the UTs 1008. For example, the scheduling system 1056 may determine handover data that indicates when communication is to be transferred from the first satellite 1002(1) to the second satellite 1002(2). Continuing the example, the scheduling system 1056 may also specify communication parameters such as frequency, timeslot, and so forth. During operation, the scheduling system 1056 may use information such as the orbital data 1054, system status data 1058, user terminal data 1060, and so forth.

The system status data 1058 may comprise information such as which UTs 1008 are currently transferring data, satellite availability, current satellites 1002 in use by respective UTs 1008, capacity available at particular ground stations 1006, and so forth. For example, the satellite availability may comprise information indicative of satellites 1002 that are available to provide communication service or those satellites 1002 that are unavailable for communication service. Continuing the example, a satellite 1002 may be unavailable due to malfunction, previous tasking, maneuvering, and so forth. The system status data 1058 may be indicative of past status, predictions of future status, and so forth. For example, the system status data 1058 may include information such as projected data traffic for a specified interval of time based on previous transfers of user data 1012. In another example, the system status data 1058 may be indicative of future status, such as a satellite 1002 being unavailable to provide communication service due to scheduled maneuvering, scheduled maintenance, scheduled decommissioning, and so forth.

The user terminal data 1060 may comprise information such as a location of a particular UT 1008. The user terminal data 1060 may also include other information such as a priority assigned to user data 1012 associated with that UT 1008, information about the communication capabilities of that particular UT 1008, and so forth. For example, a particular UT 1008 in use by a business may be assigned a higher priority relative to a UT 1008 operated in a residential setting. Over time, different versions of UTs 1008 may be deployed, having different communication capabilities such as being able to operate at particular frequencies, supporting different signal encoding schemes, having different antenna configurations, and so forth.

The UT 1008 includes a communication system 1080 to establish communication with one or more satellites 1002. The communication system 1080 of the UT 1008 may include components similar to those of the communication system 1028 of a satellite 1002 and may perform similar communication functionalities. For example, the communication system 1080 may include one or more modems, digital signal processors, power amplifiers, antennas (including at least one antenna that implements multiple antenna elements, such as a phased array antenna), processors, memories, storage devices, communications peripherals, interface buses, and so forth. The UT 1008 passes user data 1012 between the constellation of satellites 1002 and the user device 1010. The user data 1012 includes data originated by the user device 1010 or addressed to the user device 1010. The UT 1008 may be fixed or in motion. For example, the UT 1008 may be used at a residence, or on a vehicle such as a car, boat, aerostat, drone, airplane, and so forth.

The UT 1008 includes a tracking system 1082. The tracking system 1082 uses almanac data 1084 to determine tracking data 1086. The almanac data 1084 provides information indicative of orbital elements of the orbit 1004 of one or more satellites 1002. For example, the almanac data 1084 may comprise orbital elements such as "two-line element" data for the satellites 1002 in the constellation that are broadcast or otherwise sent to the UTs 1008 using the communication system 1080.

The tracking system 1082 may use the current location of the UT 1008 and the almanac data 1084 to determine the tracking data 1086 for satellite 1002. For example, based on the current location of the UT 1008 and the predicted position and movement of the satellites 1002, the tracking system 1082 is able to calculate the tracking data 1086. The tracking data 1086 may include information indicative of azimuth, elevation, distance to the second satellite, time of flight correction, or other information at a specified time. The determination of the tracking data 1086 may be ongoing. For example, the first UT 1008 may determine tracking data 1086 every 700 ms, every second, every five seconds, or at other intervals.

With regard to FIG. 10, an uplink is a communication link which allows data to be sent to satellite 1002 from a ground station 1006, UT 1008, or device other than another satellite 1002. Uplinks are designated as UL1, UL2, UL3, UL4 and so forth. For example, UL1 is a first uplink from the ground station 1006 to the second satellite 1002(2). In comparison, a downlink is a communication link which allows data to be sent from satellite 1002 to a ground station 1006, UT 1008, or device other than another satellite 1002. For example, DL1 is a first downlink from the second satellite 1002(2) to the ground station 1006. Downlinks are designated as DL1, DL2, DL3, DL4, and so forth. The satellites 1002 may also be in communication with one another. For example, a crosslink 1090 provides for communication between satellites 1002 in the constellation.

The satellite 1002, the ground station 1006, the user terminal 1008, the user device 1010, the management system 1050, or other systems described herein may include one or more computing devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control the operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 11:
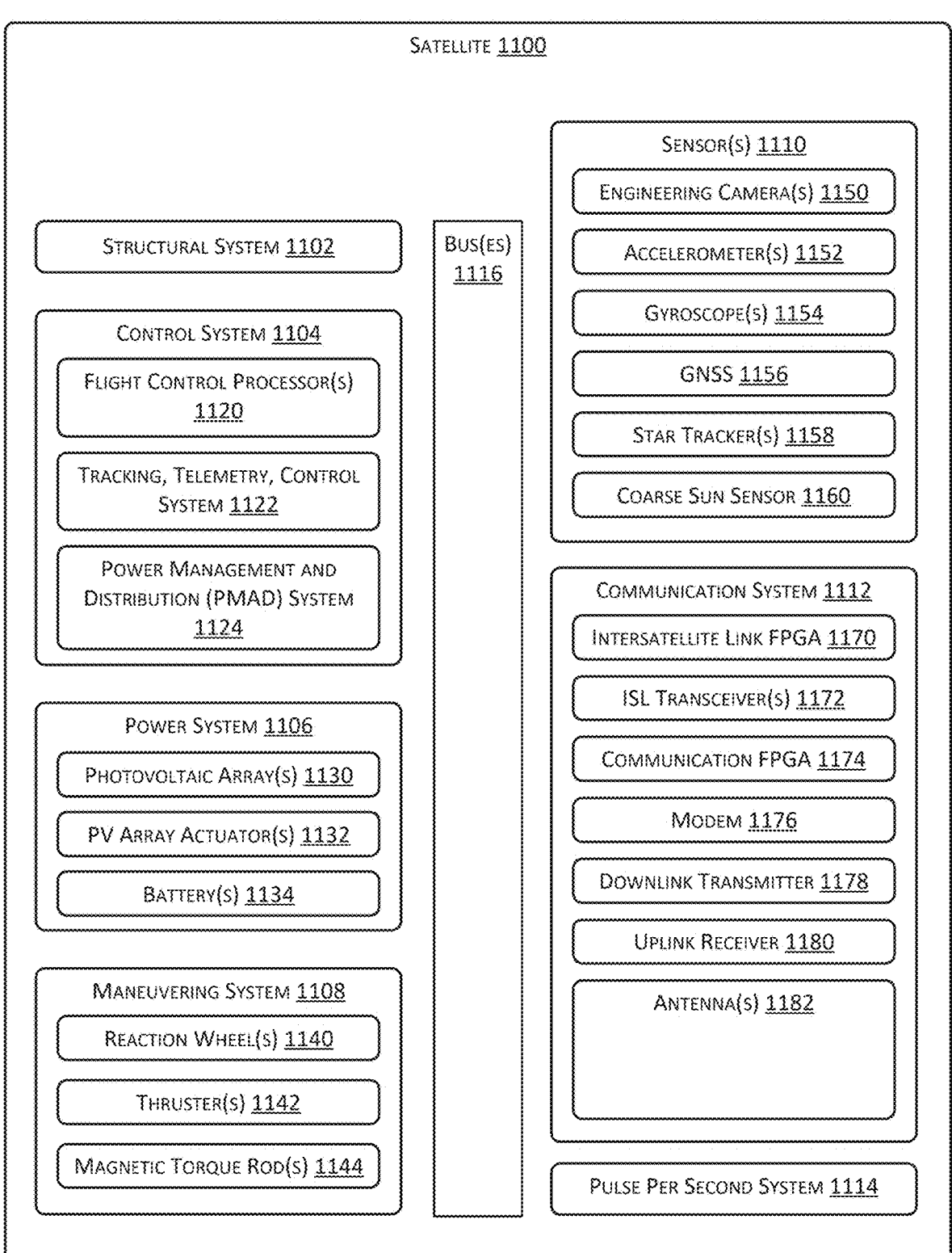
FIG. 11 is a functional block diagram of some systems associated with the satellite, according to some implementations.

FIG. 11 is a functional block diagram of some systems associated with satellite 1002, according to some implementations. The satellite 1002 may comprise a structural system 1102, a control system 1104, a power system 1106, a maneuvering system 1108, one or more sensors 1110, and a communication system 1112. A pulse per second (PPS) system 1114 may be used to provide a timing reference to the systems onboard satellite 1002. One or more buses 1116 may be used to transfer data between the systems onboard satellite 1002. In some implementations, redundant buses 1116 may be provided. The buses 1116 may include, but are not limited to, data buses such as Controller Area Network Flexible Data Rate (CAN FD), Ethernet, Serial Peripheral Interface (SPI), and so forth. In some implementations, the buses 1116 may carry other signals. For example, a radio frequency bus may comprise coaxial cable, waveguides, and so forth to transfer radio signals from one part of the satellite 1002 to another. In other implementations, some systems may be omitted or other systems added. One or more of these systems may be communicatively coupled with one another in various combinations.

The structural system 1102 comprises one or more structural elements to support the operation of satellite 1002. For example, the structural system 1102 may include trusses, struts, panels, and so forth. The components of other systems may be affixed to, or housed by, the structural system 1102. For example, the structural system 1102 may provide mechanical mounting and support for solar panels in the power system 1106. The structural system 1102 may also provide for thermal control to maintain components of the satellite 1002 within operational temperature ranges. For example, the structural system 1102 may include louvers, heat sinks, radiators, and so forth.

The control system 1104 provides various services, such as operating the onboard systems, resource management, providing telemetry, processing commands, and so forth. For example, the control system 1104 may direct the operation of the communication system 1112. The control system 1104 may include one or more flight control processors 1120. The flight control processors 1120 may comprise one or more processors, FPGAs, and so forth. A tracking, telemetry, and control (TTC) system 1122 may include one or more processors, radios, and so forth. For example, the TTC system 1122 may comprise a dedicated radio transmitter and receiver to receive commands from a ground station 1006, send telemetry to the ground station 1006, and so forth. Power management and distribution (PMAD) system 1124 may direct operation of the power system 1106, control distribution of power to the systems of the satellite 1002, control battery 1134 charging, and so forth.

The power system 1106 provides electrical power for the operation of the components onboard the satellite 1002. The power system 1106 may include components to generate electrical energy. For example, the power system 1106 may comprise one or more photovoltaic arrays 1130 comprising a plurality of photovoltaic cells, thermoelectric devices, fuel cells, and so forth. One or more PV array actuators 1132 may be used to change the orientation of the photovoltaic array(s) 1130 relative to the satellite 1002. For example, the PV array actuator 1132 may comprise a motor. The power system 1106 may include components to store electrical energy. For example, the power system 1106 may comprise one or more batteries 1134, fuel cells, and so forth.

The maneuvering system 1108 maintains the satellite 1002 in one or more of a specified orientation or orbit 1004. For example, the maneuvering system 1108 may stabilize satellite 1002 with respect to one or more axes. In another example, the maneuvering system 1108 may move the satellite 1002 to a specified orbit 1004. The maneuvering system 1108 may include one or more of reaction wheel(s) 1140, thrusters 1142, magnetic torque rods 1144, solar sails, drag devices, and so forth. The thrusters 1142 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 1106 to expel the water and produce thrust. During operation, the maneuvering system 1108 may use data obtained from one or more of the sensors 1110.

Satellite 1002 includes one or more sensors 1110. The sensors 1110 may include one or more engineering cameras 1150. For example, an engineering camera 1150 may be mounted on satellite 1002 to provide images of at least a portion of the photovoltaic array 1130. Accelerometers 1152 provide information about the acceleration of satellite 1002 along one or more axes. Gyroscopes 1154 provide information about the rotation of satellite 1002 with respect to one or more axes. The sensors 1110 may include a global navigation satellite system (GNSS) 1156 receiver, such as Global Positioning System (GPS) receiver, to provide information about the position of the satellite 1002 relative to Earth. In some implementations, the GNSS 1156 may also provide information indicative of velocity, orientation, and so forth. One or more star trackers 1158 may be used to determine an orientation of satellite 1002. A coarse sun sensor 1160 may be used to detect the sun, provide information on the relative position of the sun with respect to satellite 1002, and so forth. The satellite 1002 may include other sensors 1110 as well. For example, satellite 1002 may include a horizon detector, radar, LiDAR, and so forth.

The communication system 1112 provides communication with one or more other devices, such as other satellites 1002, ground stations 1006, user terminals 1008, and so forth. The communication system 1112 may include one or more modems 1176, digital signal processors, power amplifiers, antennas 1182 (including at least one antenna that implements multiple antenna elements, such as a phased array antenna such as the antenna elements 104 of FIG. 1), processors, memories, storage devices, communications peripherals, interface buses, and so forth. Such components support communications with other satellites 1002, ground stations 1006, user terminals 1008, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1112 may be output to other systems, such as to the control system 1104, for further processing. Output from a system, such as the control system 1104, may be provided to the communication system 1112 for transmission.

The communication system 1112 may include hardware to support the intersatellite link 1090. For example, an intersatellite link FPGA 1170 may be used to modulate data that is sent and received by an ISL transceiver 1172 to send data between satellites 1002. The ISL transceiver 1172 may operate using radio frequencies, optical frequencies, and so forth.

A communication FPGA 1174 may be used to facilitate communication between satellite 1002 and the ground stations 1006, UTs 1008, and so forth. For example, the communication FPGA 1174 may direct the operation of a modem 1176 to modulate signals sent using a downlink transmitter 1178 and demodulate signals received using an uplink receiver 1180. The satellite 1002 may include one or more antennas 1182. For example, one or more parabolic antennas may be used to provide communication between satellite 1002 and one or more ground stations 1006. In another example, a phased array antenna may be used to provide communication between satellite 1002 and the UTs 1008.

Figure 12:
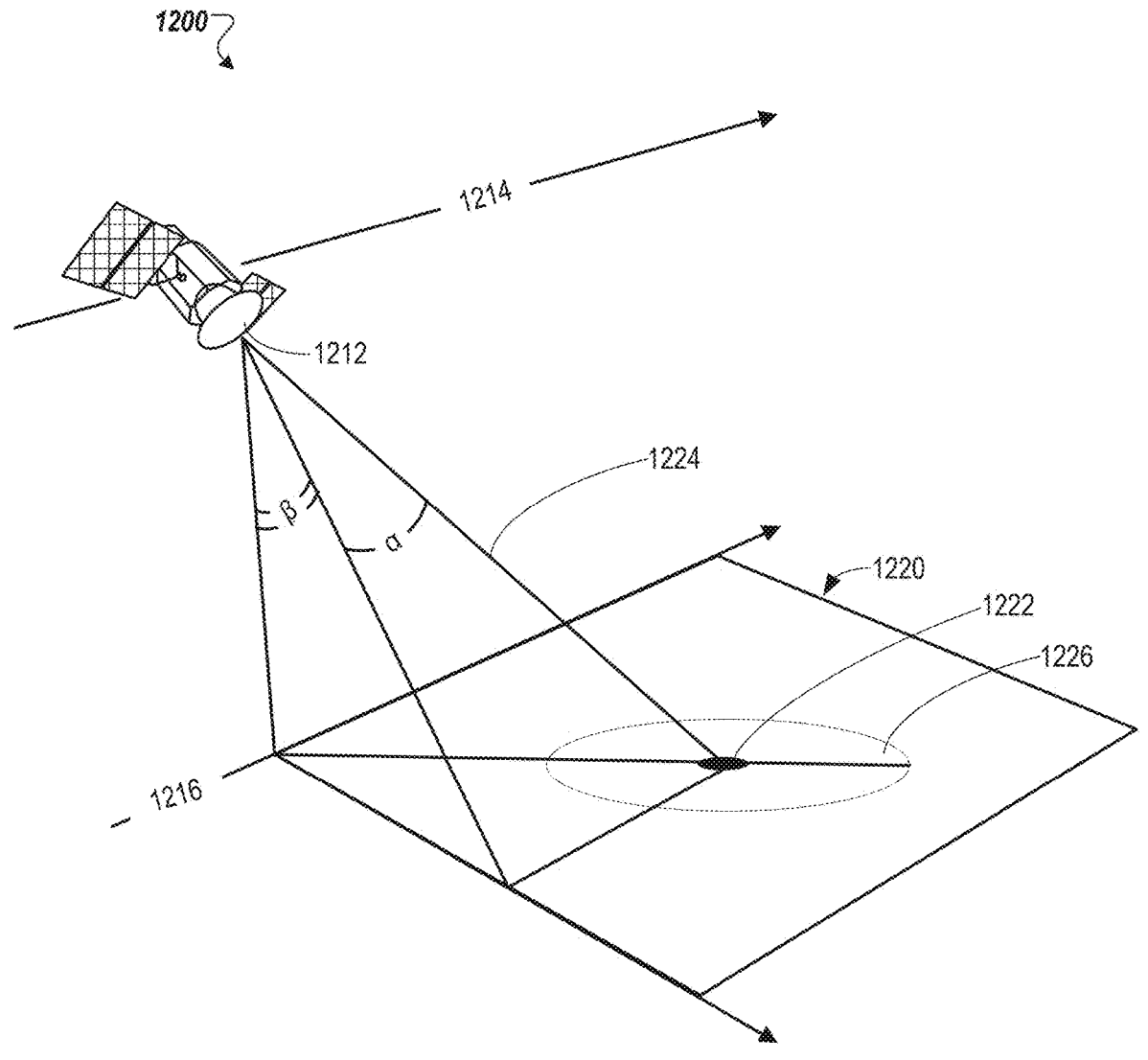
FIG. 12 illustrates a satellite including an antenna system that is steerable, according to embodiments of the present disclosure.

FIG. 12 illustrates the satellite 1200 including an antenna system 1212 that is steerable according to embodiments of the present disclosure. The satellite 1600 can include the communication system as described herein. The antenna system 1212 may include multiple antenna elements that form an antenna and that can be mechanically or electrically steered individually, collectively, or a combination thereof. In an example, the antenna is a phased array antenna.

In orbit 1004, the satellite 1200 follows a path 1214, the projection of which onto the surface of the Earth forms a ground path 1212. In the example illustrated in FIG. 12, the ground path 1212 and a projected axis extending orthogonally from the ground path 1216 at the position of the satellite 1200, together define a region 1220 of the surface of the Earth. In this example, the satellite 1200 is capable of establishing uplink and downlink communications with one or more ground stations, user terminals, or other devices within region 1220. In some embodiments, region 1220 may be located in a different relative position to the ground path 1216 and the position of the satellite 1200. For example, region 1220 may describe a region of the surface of the Earth directly below satellite 1200. Furthermore, embodiments may include communications between the satellite 1200, an airborne communications system, and so forth.

As shown in FIG. 12, a communication target 1222 (e.g., a ground station, a user terminal, or a CT (such as an HD CT)) is located within region 1220. The satellite 1200 controls the antenna system 1212 to steer transmission and reception of communications signals to selectively communicate with the communication target 1222. For example, in a downlink transmission from satellite 1200 to the communication target 1222, a signal beam 1224 emitted by the antenna system 1212 is steerable within an area 1226 of the region 1220. In some implementations, the signal beam 1224 may include multiple subbeams. The extents of the area 1226 define an angular range within which the signal beam 1224 is steerable, where the direction of the signal beam 1224 is described by a beam angle "α" relative to a surface normal vector of the antenna system 1212. In two-dimensional phased array antennas, the signal beam 1224 is steerable in two dimensions, described in FIG. 12 by a second angle "β" orthogonal to the beam angle α. In this way, area 1226 is a two-dimensional area within the region 1220, rather than a linear track at a fixed angle determined by the orientation of the antenna system 1212 relative to the ground path 1216.

In FIG. 12, as the satellite 1200 follows the path 1214, the area 1226 tracks along the surface of the Earth. In this way, the communication target 1222, which is shown centered in the area 1226 for clarity, is within the angular range of the antenna system 1212 for a period of time. During that time, signals communicated between satellite 1200 and the communication target 1222 are subject to bandwidth constraints, including but not limited to signal strength and calibration of the signal beam 1224. In an example, for phased array antenna systems, the signal beam 1224 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 13:
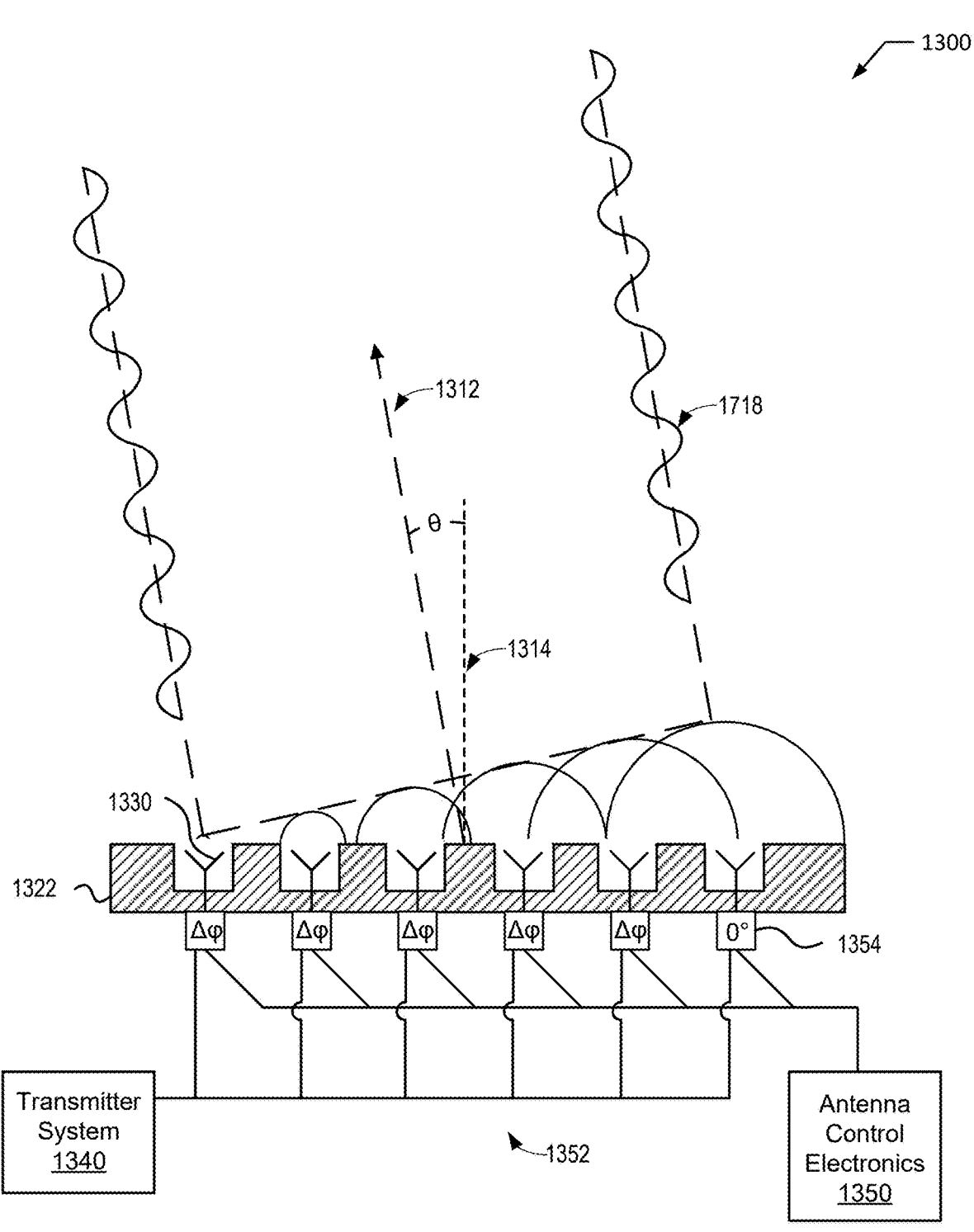
FIG. 13 illustrates a simplified schematic of an antenna, according to embodiments of the present disclosure.

FIG. 13 illustrates a simplified schematic of an antenna 1300, according to embodiments of the present disclosure. The antenna 1300 may be a component of the antenna system 1212 of FIG. 12. As illustrated, the antenna 1300 is a phased array antenna that includes multiple antenna elements 1330 (e.g. antenna elements in FIG. 1). Interference between the antenna elements 1330 forms a directional radiation pattern in both transmitter and receiver arrays forming a beam 1310 (beam extents shown as dashed lines). The beam 1310 is a portion of a larger transmission pattern (not shown) that extends beyond the immediate vicinity of the antenna 1300. The beam 1310 is directed along a beam vector 1312, described by an angle "0" relative to an axis 1314 normal to a surface of the antenna 1300. As described below, beam 1310 is one or more of steerable or shapeable through control of operating parameters including, but not limited to a phase and an amplitude of each antenna element 1330.

In FIG. 13, the antenna 1300 includes, within a transmitter section 1322, the antenna elements 1330, which may include but are not limited to, omnidirectional transmitter antennas coupled to a transmitter system 1340, such as the downlink transmitter 1178. The transmitter system 1340 provides a signal, such as a downlink signal 1718 to be transmitted to a ground station on the surface. The downlink signal 1718 is provided to each antenna element 1330 as a time-varying signal that may include several multiplexed signals. To steer the beam 1310 relative to the axis 1314, the phased array antenna system includes antenna control electronics 1350 controlling a radio frequency (RF) feeding network 1352, including multiple signal conditioning components 1354 interposed between the antenna elements 1330 and the transmitter system 1340. The signal conditioning components 1354 introduce one or more of a phase modulation or an amplitude modulation (e.g. by phase shifters), as denoted by "Δφ" in FIG. 13, to the signal sent to the antenna elements 1330. As shown in FIG. 13, introducing a progressive phase modulation produces interference in the individual transmission of each antenna element 1330 that generates the beam 1310.

The phase modulation imposed on each antenna element 1330 can differ and can be dependent on a spatial location of a communication target that determines an optimum beam vector (e.g., where the beam vector 1312 is found by one or more of maximizing signal intensity or connection strength). The optimum beam vector may change with time as the communication target 1222 moves relative to the phased array antenna system.

Figures 14A, 14B:
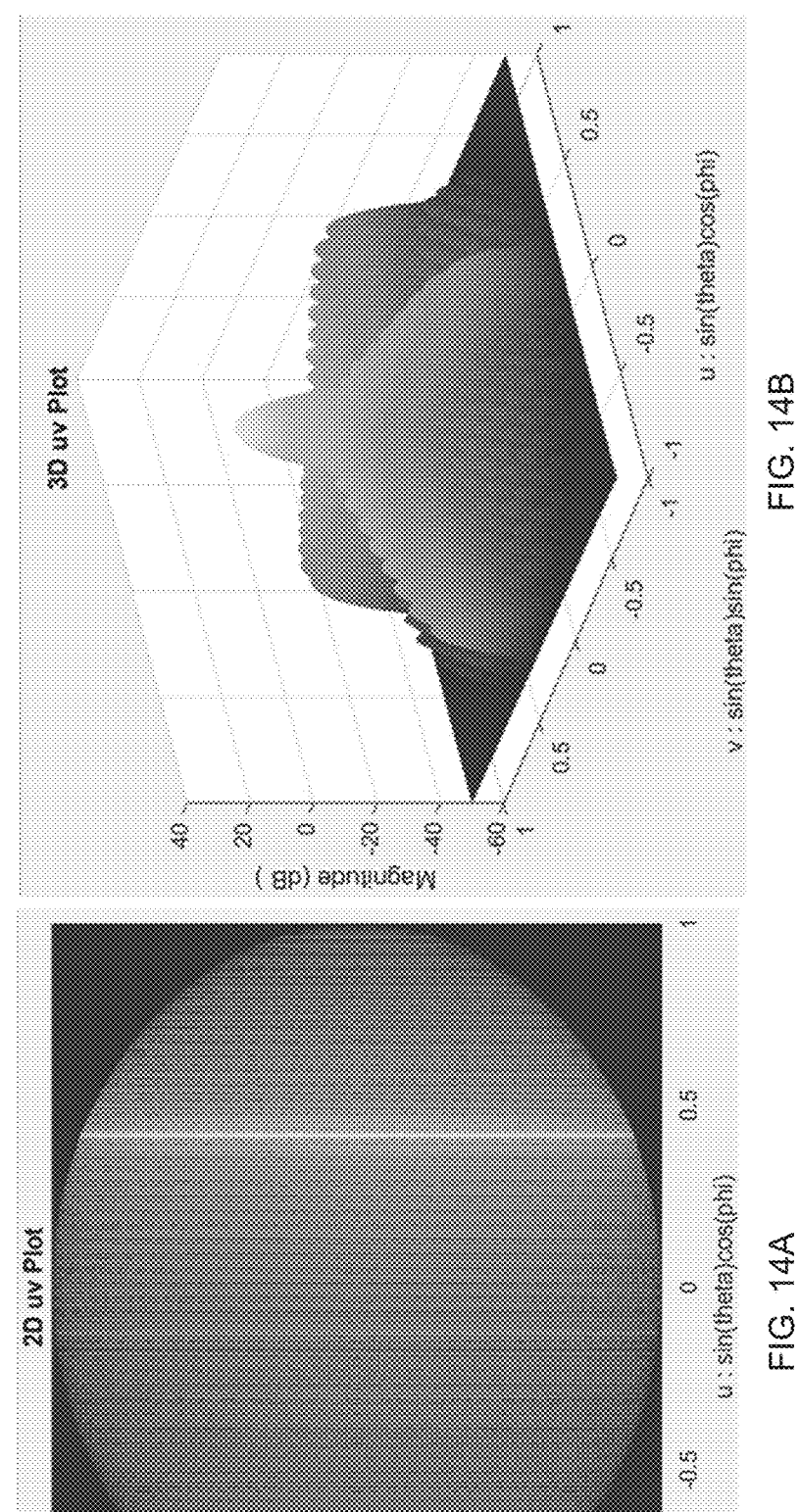
FIG. 14A is a 2D uv plot of the array factor of a linear array computed by the array factor processing engine, according to at least one embodiment.
FIG. 14B is a 3D uv plot of the array factor of a rectangular planar array computed by the array factor processing engine, according to at least one embodiment.

FIG. 14A is a 2D uv plot 1400 of the array factor of a linear array computed by the array factor processing engine, according to at least one embodiment.

FIG. 14B is a 3D uv plot 1402 of the array factor of a rectangular planar array computed by the array factor processing engine, according to at least one embodiment.

Figure 14C:
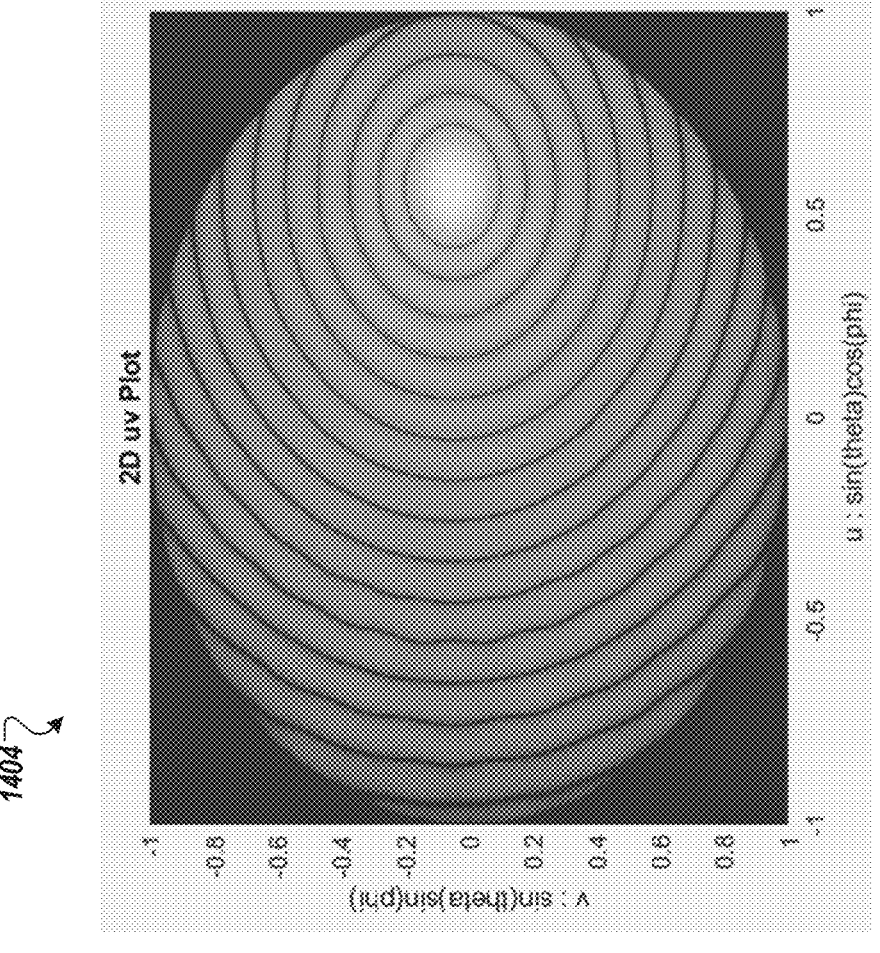
FIG. 14C is a 2D uv plot of the array factor of a circular planar array computed by the array factor processing engine, according to at least one embodiment.

FIG. 14C is a 2D uv plot 1404 of the array factor of a circular planar array computed by the array factor processing engine, according to at least one embodiment.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above description, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:

a phased array antenna comprising a plurality of antenna elements, wherein the plurality of antenna elements are organized in a two-dimensional planar array;

digital beam forming (DBF) circuitry coupled to the phased array antenna;

a processing device operatively coupled to the DBF circuitry; and a memory device operatively coupled to the processing device, wherein the memory device stores instructions that, when executed by the processing device, cause the processing device to perform operations comprising:

receiving input comprising an azimuth angle value and an elevation angle value;

receiving a first value that specifies a distance between a first element and a second element of the plurality of antenna elements in a first dimension, a second value that specifies a wavelength associated with an operating frequency of the phased array antenna, a third value that specifies a first sampling frequency in the first dimension, a fourth value that specifies a distance between the first element and the second element of the plurality of antenna elements in a second dimension, and a fifth value that specifies a second sampling frequency in the second dimension, wherein the first value and the fourth value define an inter-element distance between the first element and the second element;

defining a first set of coordinate values using the first, second, and third values, wherein the first set of coordinate values are representative of a first relationship between the elevation angle value and the azimuth angle value, and wherein the first set of coordinate values correspond to a first dimension of a first coordinate space;

defining a second set of coordinate values using the second, fourth, and fifth values, wherein the second set of coordinate values are representative of a second relationship between the elevation angle value and the azimuth angle value, and wherein the second set of coordinate values correspond to a second dimension of the first coordinate space;

defining a set of amplitudes, wherein each amplitude of the set of amplitudes is based on the third value, the fifth value, an excitation amplitude of a respective one of the plurality of antenna elements, and an excitation phase of the respective one of the plurality of antenna elements;

determining a spatial positioning of a third phantom element within the two-dimensional planar array, wherein the third phantom element has a zero amplitude, wherein the spatial positioning is determined to be between the first element and the second element such that a third distance, defined between the first element and the third phantom element or the second element and the third phantom element, is less than the inter-element distance; and determining first array factor values for the phased array antenna in the first coordinate space by computing a two-dimensional inverse Fast Fourier Transform (IFFT) using the set of amplitudes, the zero amplitude and the spatial positioning of the third phantom element, the first set of coordinate values, and the second set of coordinate values, wherein the first array factor values are determined without the elevation angle value or the azimuth angle value.

2. The wireless device of claim 1, wherein the processing device is further to perform operations comprising:

determining second array factor values for the phased array antenna by performing a two-dimensional spline interpolation on the first array factor values at points in the first coordinate space corresponding to the plurality of antenna elements, wherein each of the second array factor values comprises a first component representing a magnitude to be applied at the respective one of the plurality of antenna elements and a second component representing a phase or delay to be applied at the respective one of the plurality of antenna elements; and sending the second array factor values to the DBF circuitry that causes the phased array antenna to steer a radiation beam using the second array factor values, wherein the first set of coordinate values depend on the third value and a first ratio of the second value divided by the first value, wherein the second set of coordinate values depend on the fifth value and a second ratio of the second value divided by the fourth value.

3. The wireless device of claim 1, wherein the first array factor values corresponding to negative coordinate values of the first set of coordinate values and the second set of coordinate values are computed using a periodicity of the two-dimensional IFFT.

4. The wireless device of claim 1, wherein the processing device is further to perform operations comprising:

receiving additional input comprising vi) a sixth value that specifies a third sampling frequency that is higher than the first sampling frequency, and vii) a seventh value that specifies a fourth sampling frequency that is higher than the second sampling frequency;

defining a second set of amplitudes of the two-dimensional IFFT, each amplitude of the second set of amplitudes being based on the sixth value, the seventh value, the excitation amplitude of the respective one of the plurality of antenna elements, and the excitation phase of the respective one of the plurality of antenna elements;

determining third array factor values for the phased array antenna in the first coordinate space by computing the two-dimensional IFFT of the second set of amplitudes in the first coordinate space using the first set of coordinate values and the second set of coordinate values;

determining fourth array factor values for the phased array antenna by performing a two-dimensional spline interpolation on the third array factor values at points in the first coordinate space, wherein each of the fourth array factor values comprises a first component representing a magnitude to be applied at the respective one of the plurality of antenna elements and a second component representing a phase or delay to be applied at the respective one of the plurality of antenna elements; and sending the fourth array factor values to the DBF circuitry that causes the phased array antenna to steer a radiation beam using the fourth array factor values.

5. The wireless device of claim 1, wherein the processing device is further to perform operations comprising:

multiplying the first array factor values by a first skew value based on an offset starting position of the two-dimensional planar array from an origin in a first dimension; and multiplying the first array factor values by a second skew value based on an offset starting position of the two-dimensional planar array from the origin in a second dimension.

6. The wireless device of claim 1, wherein the two-dimensional planar array comprises a custom grid for which the plurality of antenna elements are placed at a user-defined angle from a horizontal axis.

7. The wireless device of claim 1, wherein the processing device is further to perform operations comprising:

determining spatial positionings of a plurality of third phantom elements within the two-dimensional planar array, wherein each third phantom element of the plurality of third phantom elements has a zero amplitude; and including the plurality of third phantom elements within the two-dimensional planar array.

8. A computing system comprising:

a processing device; and a memory device operatively coupled to the processing device, wherein the memory device stores instructions that, when executed by the processing device, cause the processing device to perform operations comprising:

receiving input comprising an azimuth angle value and an elevation angle value;

receiving a first value that specifies a distance between a first element and a second element of a plurality of antenna elements organized in a two-dimensional planar array in a first dimension of a phased array antenna, a second value that specifies a wavelength associated with an operating frequency of the phased array antenna, a third value that specifies a first sampling frequency in the first dimension, a fourth value that specifies a distance between a first element and a second element of the plurality of antenna elements in a second dimension, and a fifth value that specifies a second sampling frequency in the second dimension, wherein the first value and the fourth value define an inter-element distance between the first element and the second element;

defining a first set of coordinate values using the first, second, and third values, wherein the first set of coordinate values are representative of a first relationship between the elevation angle value and the azimuth angle value, and wherein a first dimension of a first coordinate space corresponds to the first set of coordinate values;

defining a second set of coordinate values using the second, fourth, and fifth values, wherein the second set of coordinate values are representative of a second relationship between the elevation angle value and the azimuth angle value, and wherein a second dimension of the first coordinate space corresponds to the second set of coordinate values;

defining a set of amplitudes, wherein each amplitude of the set of amplitudes is based on the third value, the fifth value, an excitation amplitude of a respective one of the plurality of antenna elements, and an excitation phase of the respective one of the plurality of antenna elements;

determining a spatial positioning of a third phantom element within the two-dimensional planar array, wherein the third phantom element has a zero amplitude, wherein the spatial positioning is determined to be between the first element and the second element such that a third distance, defined between the first element and the third phantom element or the second element and the third phantom element, is less than the inter-element distance; and determining first array factor values for the phased array antenna by computing a two-dimensional inverse Fast Fourier Transform (IFFT) using the set of amplitudes, the zero amplitude and the spatial positioning of the third phantom element, the first set of coordinate values, and the second set of coordinate values, wherein the first array factor values are determined without the elevation angle value or the azimuth angle value.

9. The computing system of claim 8, wherein the processing device is further to perform operations comprising:

determining second array factor values for the phased array antenna by performing a two-dimensional spline interpolation on the first array factor values at points in the first coordinate space corresponding to a plurality of antenna elements of the phased array antenna, wherein each of the second array factor values comprises a first component representing a magnitude to be applied at the respective one of the plurality of antenna elements and a second component representing a phase or delay to be applied at the respective one of the plurality of antenna elements; and sending the second array factor values to digital beam forming (DBF) circuitry that causes the phased array antenna to steer a radiation beam using the second array factor values, wherein the first coordinate set of values depend on the third value and a first ratio of the second value divided by the first value, wherein the second set of coordinate values depend variable depends on the fifth value and a second ratio of the second value divided by the fourth value.

10. The computing system of claim 8, wherein the first array factor values corresponding to negative coordinate values of the first and second sets of coordinate values are computed using a periodicity of a one-dimensional inverse Fast Fourier Transform (IFFT).

11. The computing system of claim 8, wherein the processing device is further to perform operations comprising:

receiving additional input comprising vi) a sixth value that specifies a third sampling frequency that is higher than the first sampling frequency, and vii) a seventh value that specifies a fourth sampling frequency that is higher than the second sampling frequency;

defining a second set of amplitudes of the two-dimensional IFFT, each amplitude of the second set of amplitudes being based on the sixth value, the seventh value, the excitation amplitude of the respective one of a plurality of antenna elements of the phased array antenna, and the excitation phase of the respective one of the plurality of antenna elements;

determining third array factor values for the phased array antenna in the first coordinate space by computing the two-dimensional IFFT of the second set of amplitudes in the first coordinate space using the first and second sets of coordinate values;

determining fourth array factor values for the phased array antenna by performing a two-dimensional spline interpolation on the third array factor values at points in the first coordinate space, wherein each of the fourth array factor values comprises a first component representing a magnitude to be applied at the respective one of the plurality of antenna elements and a second component representing a phase or delay to be applied at the respective one of the plurality of antenna elements; and sending the fourth array factor values to digital beam forming (DBF) circuitry that causes the phased array antenna to steer a radiation beam using the fourth array factor values.

12. The computing system of claim 8, wherein the phased array antenna comprises a plurality of antenna elements organized in a two-dimensional planar array, wherein the processing device is further to perform operations comprising:

multiplying the first array factor values by a first skew value based on an offset starting position of the two-dimensional planar array from an origin in a first dimension; and multiplying the first array factor values by a second skew value based on an offset starting position of the two-dimensional planar array from the origin in a second dimension.

13. The computing system of claim 8, wherein the phased array antenna comprises a plurality of antenna elements organized in a two-dimensional planar array, wherein the two-dimensional planar array comprises a custom grid for which the plurality of antenna elements are placed at a user-defined angle from a horizontal axis.

14. The computing system of claim 8, wherein the processing device is further to perform operations comprising:

determining spatial positionings of a plurality of third phantom elements within the two-dimensional planar array, wherein each third phantom element of the plurality of third phantom elements has a zero amplitude; and including the plurality of third phantom elements within the two-dimensional planar array.

15. The computing system of claim 8, wherein the computing system is coupled to digital beam forming (DBF) circuitry, wherein the DBF circuitry is coupled to a plurality of antenna elements of the phased array antenna, wherein the plurality of antenna elements are organized in a two-dimensional array, wherein the two-dimensional array is at least one of a planar array or a circular array.

16. A method of operating a wireless device, the method comprising:

receiving input comprising an azimuth angle value and an elevation angle value, wherein the azimuth angle value and the elevation angle value are associated with digital beam forming (DBF) circuitry coupled to a phased array antenna comprising a plurality of antenna elements organized in a two-dimensional planar array;

receiving a first value that specifies a distance between a first element and a second element of the plurality of antenna elements in a first dimension, a second value that specifies a wavelength associated with an operating frequency of the phased array antenna, a third value that specifies a first sampling frequency in the first dimension, a fourth value that specifies a distance between the first element and the second element of the plurality of antenna elements in a second dimension, and a fifth value that specifies a second sampling frequency in the second dimension, wherein the first value and the fourth value define an inter-element distance between the first element and the second element;

defining a first set of coordinate values using the first, second, and third values, wherein the first set of coordinate values are representative of a first relationship between the elevation angle value and the azimuth angle value, and wherein the first set of coordinate values correspond to a first dimension of a first coordinate space;

defining a second set of coordinate values using the second, fourth, and fifth values, wherein the second set of coordinate values are representative of a second relationship between the elevation angle value and the azimuth angle value, and wherein the second set of coordinate values correspond to a second dimension of the first coordinate space;

defining a set of amplitudes, wherein each amplitude of the set of amplitudes is based on the third value, the fifth value, an excitation amplitude of a respective one of the plurality of antenna elements, and an excitation phase of the respective one of the plurality of antenna elements;

determining a spatial positioning of a third phantom element within the two-dimensional planar array, wherein the third phantom element has a zero amplitude, wherein the spatial positioning is determined to be between the first element and the second element such that a third distance, defined between the first element and the third phantom element or the second element and the third phantom element, is less than the inter-element distance; and determining first array factor values for the phased array antenna in the first coordinate space by computing a two-dimensional inverse Fast Fourier Transform (IFFT) using the set of amplitudes, the zero amplitude and the spatial positioning of the third phantom element, the first set of coordinate values, and the second set of coordinate values, and wherein the first array factor values are determined without the elevation angle value or the azimuth angle value.

17. The method of claim 16, further comprising:

determining second array factor values for the phased array antenna by performing a two-dimensional spline interpolation on the first array factor values at points in the first coordinate space corresponding to the plurality of antenna elements, wherein each of the second array factor values comprises a first component representing a magnitude to be applied at the respective one of the plurality of antenna elements and a second component representing a phase or delay to be applied at the respective one of the plurality of antenna elements; and sending the second array factor values to the DBF circuitry that causes the phased array antenna to steer a radiation beam using the second array factor values, wherein the first set of coordinate values depend on the third value and a first ratio of the second value divided by the first value, wherein the second set of coordinate values depend on the fifth value and a second ratio of the second value divided by the fourth value.

18. The method of claim 16, further comprising:

receiving additional input comprising vi) a sixth value that specifies a third sampling frequency that is higher than the first sampling frequency, and vii) a seventh value that specifies a fourth sampling frequency that is higher than the second sampling frequency;

defining a second set of amplitudes of the two-dimensional IFFT, each amplitude of the second set of amplitudes being based on the sixth value, the seventh value, the excitation amplitude of the respective one of the plurality of antenna elements, and the excitation phase of the respective one of the plurality of antenna elements;

determining third array factor values for the phased array antenna in the first coordinate space by computing the two-dimensional IFFT of the second set of amplitudes in the first coordinate space using the first and second sets of coordinate values;

determining fourth array factor values for the phased array antenna by performing a two-dimensional spline interpolation on the third array factor values at points in the first coordinate space, wherein each of the fourth array factor values comprises a first component representing a magnitude to be applied at the respective one of the plurality of antenna elements and a second component representing a phase or delay to be applied at the respective one of the plurality of antenna elements; and sending the fourth array factor values to the DBF circuitry that causes the phased array antenna to steer a radiation beam using the fourth array factor values.

19. The method of claim 16, further comprising computing, using a periodicity of a one-dimensional IFFT, a portion of the first array factor values that correspond to negative coordinate values of the first and second sets of coordinate values.

\* \* \* \* \*